United States Patent
Suzuki et al.

(10) Patent No.: US 8,458,478 B2
(45) Date of Patent: Jun. 4, 2013

(54) SIGNATURE GENERATING APPARATUS, SIGNATURE VERIFYING APPARATUS, AND METHODS AND PROGRAMS THEREFOR

(75) Inventors: Koutarou Suzuki, Tokyo (JP); Masayuki Abe, Tokyo (JP); Tatsuaki Okamoto, Tokyo (JP); Atsushi Fujioka, Tokyo (JP); Go Yamamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 421 days.

(21) Appl. No.: 12/682,896

(22) PCT Filed: Apr. 24, 2008

(86) PCT No.: PCT/JP2008/057962
§ 371 (c)(1),
(2), (4) Date: Jun. 22, 2010

(87) PCT Pub. No.: WO2009/057338
PCT Pub. Date: May 7, 2009

(65) Prior Publication Data
US 2010/0268957 A1    Oct. 21, 2010

(30) Foreign Application Priority Data
Oct. 29, 2007  (JP) .............................. 2007-280287

(51) Int. Cl.
*H04L 9/32* (2006.01)

(52) U.S. Cl.
USPC ........................................................ 713/176

(58) Field of Classification Search
USPC .................... 713/176, 180; 380/44
See application file for complete search history.

(56) References Cited

U.S. PATENT DOCUMENTS

| 6,266,771 | B1 | 7/2001 | Bellare et al. |
| 2002/0046339 | A1 | 4/2002 | Bellare et al. |
| 2005/0018850 | A1* | 1/2005 | Venkatesan et al. .......... 380/277 |

FOREIGN PATENT DOCUMENTS

EP          0 977 165 A1    2/2000

OTHER PUBLICATIONS

Ma, Weng, and Zheng. Fast Digital Signature Schemes as Secure as Diffie-Hellman Assumptions. Jan. 22, 2007. Cryptology ePrint Archive: Report 2007/019.*

Office Action issued Dec. 8, 2011, in Canadian Patent Application No. 2,702,280.

Abe, M. et al. "A Signature Scheme With Message Recovery As Secure As Discrete Logarithm", Paper Special Section on Cryptography and Information Security, IEICE Transactions on Fundamentals of Electronics, Communications and Computer Sciences, vol. E84-A, No. 1, pp. 197-204 (Jan. 2001).

(Continued)

*Primary Examiner* — Tamara Teslovich
(74) *Attorney, Agent, or Firm* — Oblon, Spivak, McClelland, Maier & Neustadt, L.L.P.

(57) ABSTRACT

A signature is generated by a scheme in which x denotes a secret key of a signature generating apparatus, $m_{rec} \in \{0, 1\}^M$ denotes a recovery message, k denotes an arbitrary value, g denotes a generator of a cyclic group G of order q, R represents $g^k \in G$, $H_1$ represents a hash function $H_1: \{0, 1\}^* \to \{0, 1\}^L$, $H_2$ represents a hash function $H_2: \{0, 1\}^* \to \{0, 1\}^M$ that has a variable output length, $H_3$ represents a hash function $H_3: \{0, 1\}^* \to Z_q$, $r = H_1(R, m_{rec})|m_{rec}(+)H_2(R, H_1(R, m_{rec}))$, where (+) represents an exclusive-OR operator, t is defined for $\gamma$, which depends on r, as $t = H_3(\gamma)$, s is defined as $s = k - t \cdot x \in Z$, and a signature is $\sigma = (r, s)$.

28 Claims, 21 Drawing Sheets

OTHER PUBLICATIONS

Miyaji, A. "A Message Recovery Signature Scheme Equivalent to DSA Over Elliptic Curves", Lecture Notes in Computer Science, vol. 1163, pp. 1-14 (Nov. 6, 1996).

Pintsov, L. A. et al. "Postal Revenue Collection in the Digital Age", http:// citeseer.ist.psu.edu/339598.html, Total pp. 17 (2000).

Nyberg, K. et al., "Message Recovery for Signature Schemes Based on the Discrete Logarithm Problem", Lecture Notes in Computer Science, vol. 950, pp. 182-193 (Oct. 16, 1995).

Mihara, A. et al., "Short Signatures With Message Recovery in the Random Oracle Model", The 2004 Symposium on Cryptography and Information Security (SCIS2004) Proceedings CD-ROM, 2D4 Digital Signature II, 2D4-4 Total pp. 8 (Jan. 27, 2004) (with English translation).

Chen, K., "Signature With Message Recovery", Electronics Letters, vol. 34, No. 20, p. 1934 (Oct. 1, 1998).

Suzuki, K. et al., "A CDH-Based Message Recovery Signature With Tight Security Reduction", The 2008 Symposium on Cryptography and Information Security Proceedings, 3F-2 Signature (1), 3F2-5, pp. 1-5 (Total pp. 8) (Jan. 22-25, 2008) (with English translation).

Abe, M.. et al., "A Signature Scheme With Message Recovery As Secure As Discrete Logarithm," ASIACRYPT'99, LNCS 1716, pp. 378-389 (1999).

Koblitz, N. "Elliptic Curve Cryptosystems", Mathematics of Computation, vol. 48, No. 177, pp. 203-209 (Jan. 1987).

Miller, V. S. "Use of Elliptic Curves in Cryptography", In Advances in Cryptology—CRYPTO 85, vol. 218, Lecture Notes in Computer Science, pp. 417-426 (Aug. 18-22, 1985).

Blake, I. F. et al., "Elliptic Curves in Cryptography", Pearson Education, ISBN-4-89471-431-0, (Total pp. 8) (1999) (with English translation).

"Elliptic Curve Abe-Okamoto-Suzuki Message Recovery Signature Scheme(ECAOS) Working Draft", pp. 1-7 (Aug. 25, 2008).

Abe, M. et al. "Message Recovery Signature Schemes From Sigma-Protocols", Selected Papers: Research Activities in Laboratories of New NTT Fellows Part II, NTT Technical Review, vol. 6 No. 1, pp. 1-11 (Jan. 2008).

Office Action issued Nov. 8, 2011, in Japanese Patent Application No. 2007-280287 with English translation.

"Information Technology—Security Techniques—Digital signature schemes giving message recovery—Part 3: Discrete logarithm based Mechanisms", Internationalstandard ISO/IEC 9796-3, Sep. 15, 2006, Second Edition, pp. 27-29.

Extended Search Report issued Feb. 15, 2012 in European Patent Application No. 08752053.2-1525/2207156.

* cited by examiner

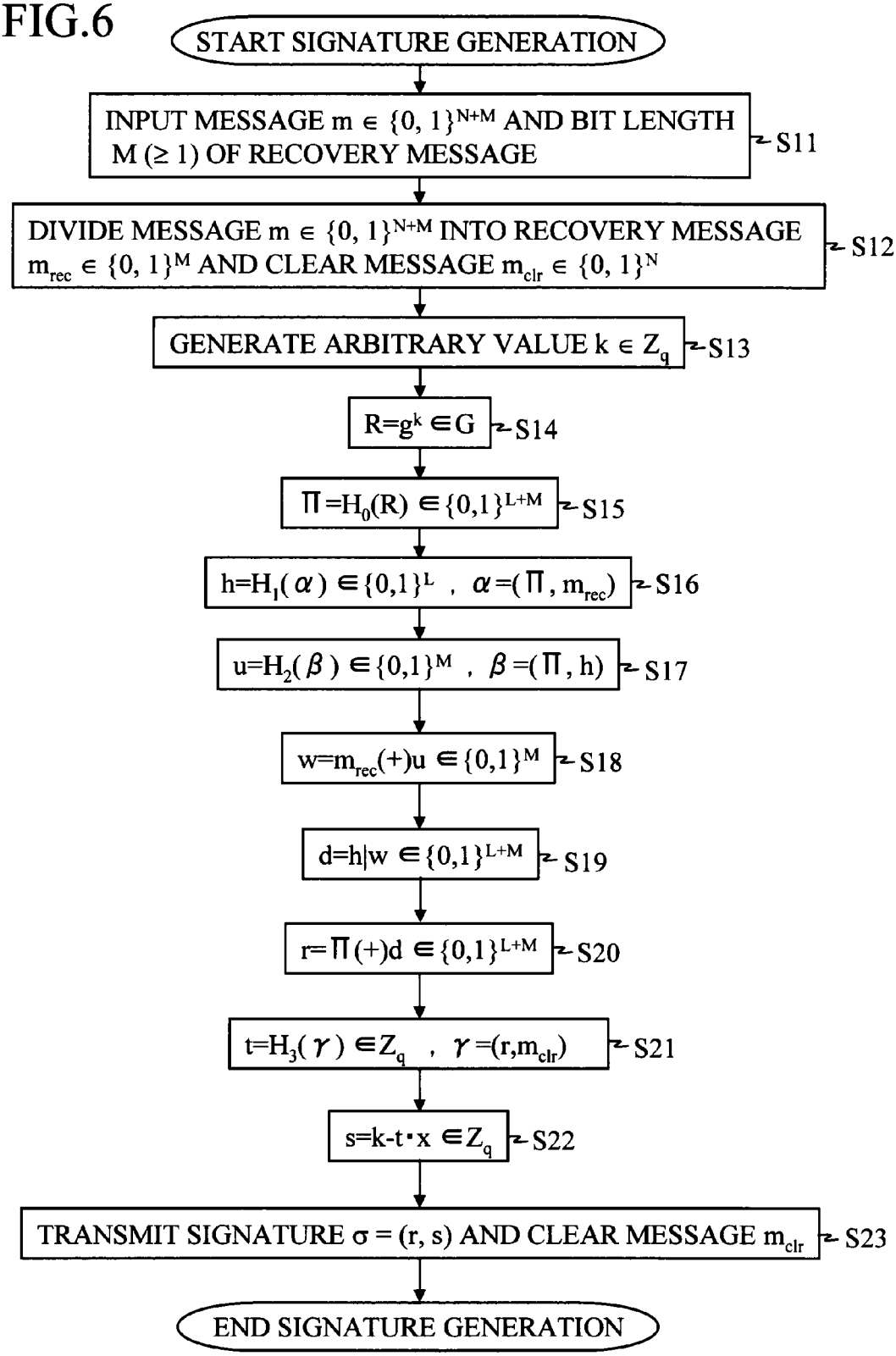

FIG.12

```
START SIGNATURE GENERATION
        ↓
INPUT RECOVERY MESSAGE m_rec ∈ {0,1}^M  — S111
        ↓
EXTRACT AND STORE BIT LENGTH M OF
RECOVERY MESSAGE m_rec ∈ {0,1}^M  — S112
        ↓
GENERATE ARBITRARY VALUE k ∈ Z_q  — S113
        ↓
R = g^k ∈ G  — S114
        ↓
Π = H_0(R) ∈ {0,1}^{L+M}  — S115
        ↓
h = H_1(α) ∈ {0,1}^L ,  α = (Π, m_rec)  — S116
        ↓
u = H_2(β) ∈ {0,1}^M ,  β = (Π, h)  — S117
        ↓
w = m_rec (+) u ∈ {0,1}^M  — S118
        ↓
d = h|w ∈ {0,1}^{L+M}  — S119
        ↓
r = Π (+) d ∈ {0,1}^{L+M}  — S120
        ↓
t = H_3(γ) ∈ Z_q ,  γ = r  — S121
        ↓
s = k − t·x ∈ Z_q  — S122
        ↓
TRANSMIT SIGNATURE σ = (r, s)  — S123
        ↓
END SIGNATURE GENERATION
```

SIGNATURE GENERATING APPARATUS, SIGNATURE VERIFYING APPARATUS, AND METHODS AND PROGRAMS THEREFOR

TECHNICAL FIELD

The present invention relates to an application of an information security technique. In particular, it relates to a message-recoverable signature from which a message can be recovered.

BACKGROUND ART

Non-patent literature 1 discloses a conventional message-recoverable signature technique. This technique uses the random oracle model to guarantee security. In the following, this technique will be generally described.

According to this technique, the following conditions are assumed.

message $m \in \{0,1\}^{k2}$ function $F_1: \{0,1\}^{k2} \to \{0,1\}^{k1}$ function $F_2: \{0,1\}^{k1} \to \{0,1\}^{k2}$ function $H: \{0,1\}^{k1+k2} \to \{0,1\}^{k}$ E: elliptic curve defined on a finite field $F_q$
p: prime number that satisfies $p \cdot R = O$, where R represents a point on the elliptic curve E, and O represents a point at infinity
G1: points in a subset of the elliptic curve E, where order of the subset is p $W \in Z/pZ$ secret key: $x \in Z/pZ$ public key: $(F_q, E, G1, Y)(Y = -x \cdot G1(\in E))$ $\{0, 1\}^\delta$ represents $\delta$-bit data, and $\{0, 1\}^\delta \to \{0, 1\}^\epsilon$ represents a function of mapping of $\delta$-bit data to $\epsilon$-bit data.

<Signature Generation>

Signature generation is performed as follows. Note that $R_x$ represents the x coordinate of the point $R \in E$, and (+) represents an exclusive OR operator.

$$m' = F_1(m) | (F_2(F_1(m))(+)m) \quad (1)$$

$$R_x = (w \cdot G1)_x$$

$$r = R(+)m' \quad (2)$$

$$c = H(r)$$

$$z = w + c \cdot x \bmod p$$

signature $\sigma = (r, z)$

<Signature Verification>

Signature verification is performed as follows. Note that $[m']^{k1}$ represents the leading k1 bits of m', and $[m]^{k2}$ represents the remaining k2 bits of m'.

$$m' = r(+)(z \cdot G1 + H(r) \cdot Y)_x$$

$$m = [m']^{k2}(+)F_2([m']^{k1})$$

If $[m']^{k1} = F_1(m)$, the verification is passed.

Non-patent literature 1: Masayuki Abe, Tatsuaki Okamoto, "A Signature Scheme with Message Recovery as Secure as Discrete Logarithm," ASIACRYPT 1999, pp. 378-389

DISCLOSURE OF THE INVENTION

Problem to be Solved by the Invention

However, according to the method described in the non-patent literature 1, $(F_2(F_1(m)))$ in the expression (1) and the $R_x$ in the expression (2) have a fixed bit length, and the message m has to have a fixed bit length.

As a result, there is a problem of inefficiency that even when the message m is shorter than the fixed length, the bit length of a part r of the signature σ cannot be accordingly shortened. In addition, when the bit length of the message m is longer than the fixed length, only a part of the message m can be substituted into the expression (1), and thus, a message-recoverable signature intended for all the bits of the message m cannot be generated.

Means to Solve the Problems

A signature generating apparatus according to the present invention performs signature generation as described below. Note that a secret key x is an integer of the signature generating apparatus, and an M-bit recovery message $m_{rec} \in \{0, 1\}^M$ is at least a part of the target of the signature. The signature generating apparatus generates an arbitrary value k which is an integer, calculates $R = g^k \in G$, where G is a cyclic group of order q having a generator g, to genterate the calculation result R. Note that "$g^k \in G$" means k times calculations defined on the cyclic group G to the generator g (as described in detail later). The signature generating apparatus applies a hash function $H_1: \{0, 1\}^* \to \{0, 1\}^L$ to a value α, to generate an L-bit hash value $h = H_1(\alpha) \in \{0, 1\}^L$. Note that the hash function $H_1$ outputs an L-bit value in response to an input value, the value α depends on the calculation result R and the recovery message $m_{sec}$, L is a positive integer shared with a signature verifying apparatus. The expression "apply a function ϵ to δ" means that δ or a value that identifies δ is substituted into the function ϵ. The signature generating apparatus applies a hash function $H_2: \{0, 1\}^* \to \{0, 1\}^M$ to a value β, to generate an M-bit hash value $u = H_2(\beta) \in \{0, 1\}^M$. Note that an output bit length M of the hash function $H_2$ is determined according to the bit length M of the recovery message $m_{rec}$, and the value β depends on the calculation result R and the hash value h. The signature generating apparatus calculates an exclusive OR w of the recovery message $m_{rec}$ and the hash value u according to $w = m_{rec}(+)u \in \{0, 1\}^M$, where (+) represents an exclusive-OR operator, and outputs the exclusive-OR value w. The signature generating apparatus calculates a value r which depends on an L+M-bit bit connection value $h|w \in \{0, 1\}^{L+M}$ in which the hash value $h \in \{0, 1\}^L$ is placed at a first bit position and the exclusive-OR value $w \in \{0, 1\}^M$ is placed at a second bit position, and from which the hash value h and the exclusive-OR value w can be recovered. Note that the first bit position does not always have to comprise L consecutive bit positions but can comprise L discrete bit positions. Similarly, the second bit position does not always have to comprise M consecutive bit positions but can comprise M discrete bit positions. However, the signature generating apparatus and the signature verifying apparatus have to use a common first bit position and a common second bit position. The signature generating apparatus applies a hash function $H_3: \{0, 1\}^* \to Z$ to a value γ which depends on the value r, to generate a hash value $t = H_3(\gamma) \in Z$. Note that Z is an integer, and the hash function $H_3$ outputs an integer in response to an input value. Then, the signature generating apparatus calculates $s=k-t \cdot x \in Z$ and outputs a signature $\sigma=(r, s)$.

A signature verifying apparatus according to the present invention performs signature verification as described below. Note that a signature received by the signature verifying apparatus will be denoted by $\sigma'=(r', s')$. A public key $y=g^x \in G$ of a signature generating apparatus is stored in a storage of the signature verifying apparatus.

The signature $\sigma'=(r', s')$ is input to the signature verifying apparatus. A bit length M' of a recovery message $m_{rec}'$ associated with the signature $\sigma'$ is stored in a storage. A method by which the signature verifying apparatus acquires the value of the bit length M' will be described later. The signature verifying apparatus applies a hash function $H_3: \{0, 1\}^* \rightarrow Z$ to a value $\gamma'$ which depends on r' of the signature $\sigma'$, to generate a hash value $t'=H_3(\gamma') \in Z$. Note that Z is an integer, and the hash function $H_3$ outputs an integer in response to an input value. The signature verifying apparatus calculates $R'=g^{s'} \cdot y^{t'} \in G$ to generate the calculation result R'. Note that "$g^{s'} \cdot y^{t'} \in G$" means a calculation result obtained by calculation defined on the cyclic group G between a calculation result obtained by s' times calculations defined on the cyclic group G to the generator g, and a calculation result obtained by t' times calculations defined on the cyclic group G to the public key y (as described in detail later). The signature verifying apparatus applies a hash function $H_2: \{0, 1\}^* \rightarrow \{0, 1\}^{M'}$ to a value $\beta'$, to generate an M'-bit hash value $u'=H_2(\beta') \in \{0, 1\}^{M'}$. Note that an output bit length M' of the hash function $H_2$ is determined according to the bit length M' of the recovery message $m_{rec}'$, and the value $\beta'$ depends on the calculation result R' and an L-bit value $h' \in \{0, 1\}^L$ at a first bit position of r'. The signature verifying apparatus calculates an exclusive OR $w'(+)u'$ of a value $w' \in \{0, 1\}^{M'}$ and the hash value u', to generate a calculation result of the exclusive OR $w'(+)u'$ as the recovery message $m_{rec}' \in \{0, 1\}^{M'}$. Note that the value w' depends on an M'-bit value at a second bit position of the value r'. The signature verifying apparatus applies a hash function $H_1: \{0, 1\}^* \rightarrow \{0, 1\}^L$ to a value $\alpha'$, to generate an L-bit hash value $H_1(\alpha') \in \{0, 1\}^L$ as calculation result. Note that the hash function $H_1$ outputs an L-bit value in response to an input value, the value $\alpha'$ depends on the calculation result R' and the calculated recovery message $m_{rec}'$. The signature verifying apparatus compares the L-bit value h' and the hash value $H_1(\alpha)$, and outputs information on the condition that $h'=H_1(\alpha')$ as that verification has succeeded. Note that the expression "a value depends on $\epsilon$ and $\delta$" means not only that the value depends only on $\epsilon$ and $\delta$ but also that the value depends on $\epsilon$, $\delta$ and other information. The expression "a value depends on $\epsilon$" means not only that the value depends only on $\epsilon$ but also that the value depends on $\epsilon$ and other information. However, the configurations of the values $\alpha$, $\beta$ and $\gamma$ used in the signature generating apparatus have to be the same as the configurations of the values $\alpha'$, $\beta'$ and $\gamma'$ used in the signature verifying apparatus, respectively (as described in detail later).

According to the present invention, a hash function that has an output bit length that varies with the bit length of the recovery message and an innovative processing method are used, so that two operands of the exclusive-OR calculations can always have a common bit length even when the bit length of the recovery message varies. As a result, when the bit length of the recovery message is short, the number of bits involved in each calculation step and the number of bits of the signature $\sigma$ can be reduced accordingly. In addition, even if the bit length of the recovery message is long, a message-recoverable signature intended for all the bits of the recovery message $m_{rec}$ can be generated.

Furthermore, according to the present invention, signature verification succeeds only when the hash values h and u calculated in the signature generating apparatus and the hash values h' and u' calculated in the signature verifying apparatus matches with each other. Therefore, the security is improved compared with the case where signature verification relies only on the match between the hash values h and h'.

Unlike the prior art, according to the present invention, all the bits of the message can be the target of the message-recoverable signature ($m=m_{rec}$).

Alternatively, the target of the message-recoverable signature may not be all the bits of the message m. When the target of the message-recoverable signature is not all the bits of the message m, an M-bit recovery message $m_{rec}$ is the target of the message-recoverable signature, and an N-bit clear message $m_{clr}$ is the target of a normal signature that differs from the message-recoverable signature. In this case, preferably, the signature generating apparatus stores the N-bit clear message $m_{clr} \in \{0, 1\}^N$ in a storage, applies the hash function $H_3: \{0, 1\}^* \rightarrow Z$ to a value $\gamma$ which depends on the value r and the clear message $m_{clr}$, to calculate $t=H_3(\gamma) \in Z$, calculates $s=k-t \cdot x \in Z$, and outputs the signature $\sigma=(r, s)$ and the clear message $m_{clr}$. The signature $\sigma'$ and the clear message $m_{clr}'$ are input to the signature verifying apparatus. The signature verifying apparatus applies the hash function $H_3: \{0, 1\}^* \rightarrow Z$ to a value $\gamma'$ which depends on r' of the signature $\sigma'$ and the clear message $m_{clr}'$, and outputs a hash value $t'=H_3(\gamma') \in Z$ as calculation result.

Thus, the number of bits involved in each calculation step can be prevented from unnecessarily increasing because of all the bits of the message being designated as the target of the message-recoverable signature when all the bits of the message does not have to be the target of the message-recoverable signature. That is, a message-recoverable signature that can be flexibly applied to various messages of various bit lengths and can be used in various applications can be generated.

Effects of the Invention

The present invention provides a message-recoverable signature that can be flexibly applied to various messages of various bit lengths.

BRIEF DESCRIPTION OF THE DRAWINGS

FIG. 6 is a flow chart for illustrating a signature generation processing according to the first embodiment;

FIG. 12 is a flow chart for illustrating a signature generation processing according to the second embodiment;

DESCRIPTION OF REFERENCE NUMERALS

1 SIGNATURE SYSTEM
10, 110, 210, 310 SIGNATURE GENERATING APPARATUS
20, 120, 220, 320 SIGNATURE VERIFYING APPARATUS

BEST MODES FOR CARRYING OUT THE INVENTION

In the following, best modes for carrying out the present invention will be described with reference to the drawings.

First Embodiment

First, a first embodiment of the present invention will be described.

<General Configuration>

Figure 1:
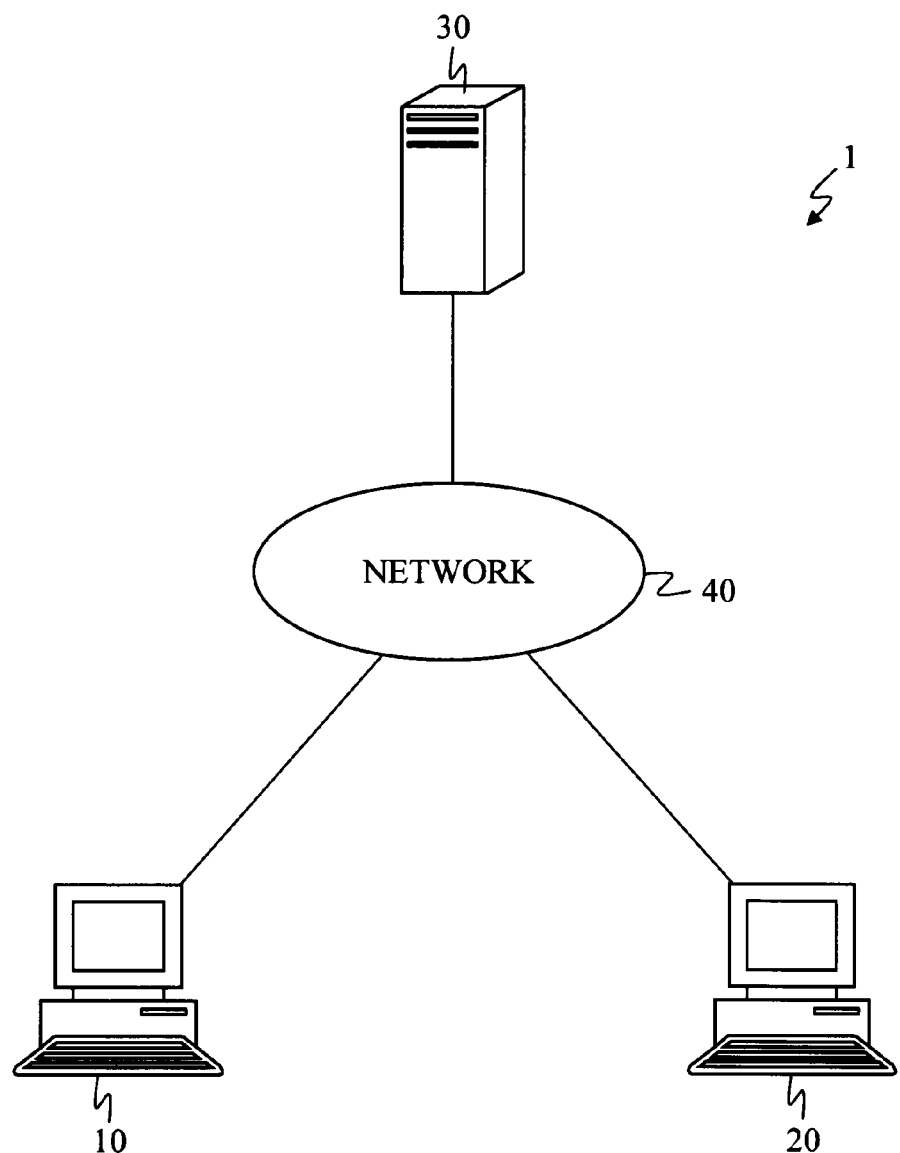
FIG. 1 is a conceptual diagram showing a general configuration of a signature system according to a first embodiment.

FIG. 1 is a conceptual diagram showing a general configuration of a signature system 1 according to the first embodiment of the present invention.

As shown in FIG. 1, a signature system 1 according to this embodiment has a signature generating apparatus 10 that generates a signature, a signature verifying apparatus 20 that verifies a signature, and a public key server apparatus 30 that presents a public key of the signature generating apparatus 10, which are connected to each other by a network 40 so that the apparatuses can communicate with each other. The signature generating apparatus 10, the signature verifying apparatus 20 and the public key server apparatus 30 are implemented by a predetermined program loaded into a well-known computer.

<Configuration of Signature Generating Apparatus 10>

Next, a configuration of the signature generating apparatus 10 will be described.

[Hardware Configuration]

Figure 2:
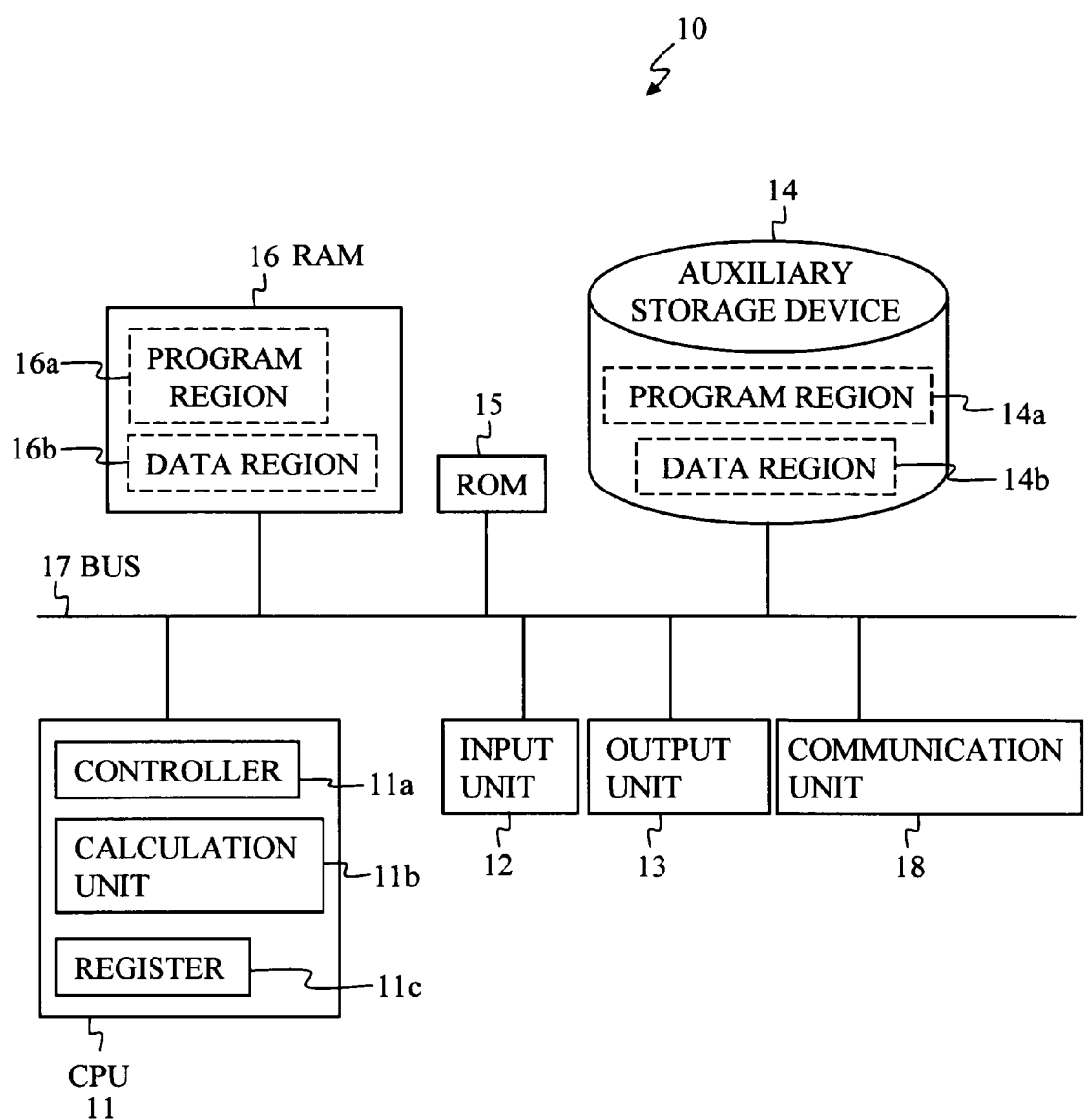
FIG. 2 is a block diagram illustrating a hardware configuration of a signature generating apparatus according to the first embodiment.

FIG. 2 is a block diagram illustrating a hardware configuration of the signature generating apparatus 10 according to the first embodiment.

As illustrated in FIG. 2, the signature generating apparatus 10 in this example has a central processing unit (CPU) 11, an input unit 12, an output unit 13, an auxiliary storage device 14, a read only memory (ROM) 15, a random access memory (RAM) 16, a bus 17 and a communication unit 18. The CPU 11 in this example has a controller 11a, a calculator 11b and a register 11c and performs various calculations according to various programs loaded into the register 11c. The input unit 12 in this example is an input port, a keyboard, a mouse or the like used for data input, and the output unit 13 is an output port, a data storage device for storing data in an external recording medium, a printer, a display or the like. The auxiliary storage device 14 is a hard disk drive, a magneto-optical disc (MO), a semiconductor memory or the like and has a program region 14a for storing various programs and a data region 14b for storing various data. The RAM 16 is a static random access memory (SRAM), a dynamic random access memory (DRAM) or the like and has a program region 16a in which the programs are written and a data region 16b in which various data is written. The communication unit 18 is a network card or the like. The bus 17 in this example connects the CPU 11, the input unit 12, the output unit 13, the auxiliary storage device 14, the ROM 15, the RAM 16 and the communication unit 18 to each other in such a manner that they can exchange data with each other.

[Cooperation Between Hardware and Program]

The CPU 11 (FIG. 2) writes programs stored in the program region 14a of the auxiliary storage device 14 in the program region 16a of the RAM 16 according to a loaded operating system (OS) program. The CPU 11 writes various data stored in the data region 14b of the auxiliary storage device 14 in the data region 16b of the RAM 16 in the same way. The addresses of the programs and data in the RAM 16 are stored in the register 11c of the CPU 11. The controller 11a of the CPU 11 sequentially reads the addresses stored in the register 11c, reads programs or data from regions in the RAM 16 indicated by the read addresses, makes the calculator 11b perform calculations represented by the programs, and stores the results of the calculations in the register 11c. Each program may be described as a single program sequence, or at least some of the programs may be stored in a library as a separate module.

Figure 3:
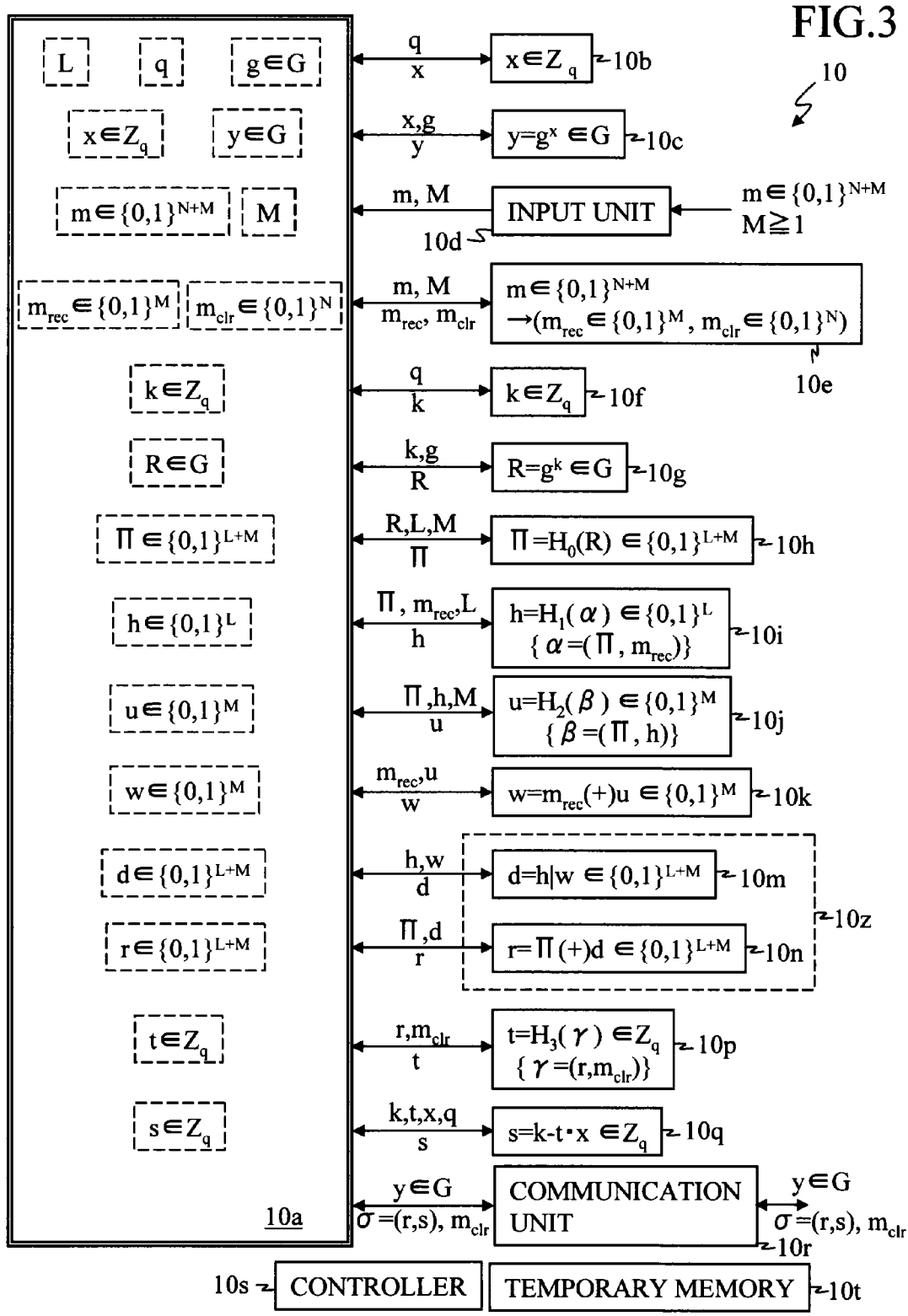
FIG. 3 is a block diagram illustrating a functional configuration of the signature generating apparatus according to the first embodiment.

FIG. 3 is a block diagram illustrating a functional configuration of the signature generating apparatus 10 according to the first embodiment, which is implemented by a program loaded into the CPU 11. In FIG. 3, the arrows indicate data flows. However, illustration of flows of data input to or output from a temporary memory 10t or controller 10s are omitted.

As shown in FIG. 3, the signature generating apparatus 10 according to this embodiment has a storage 10a, a secret key generator 10b, a public key generator 10c, an input unit 10d, a message dividing unit 10e, an arbitrary value generator 10f, a group calculator 10g, hash calculators 10h, 10i, 10j and 10p, exclusive-OR calculators 10k and 10n, a bit connecting unit 10m, an integer calculator 10q, a communication unit 10r, a controller 10s and a temporary memory 10t. The bit connecting unit 10m and the exclusive-OR calculator 10n constitute an r value calculator 10z.

Figure 4A:
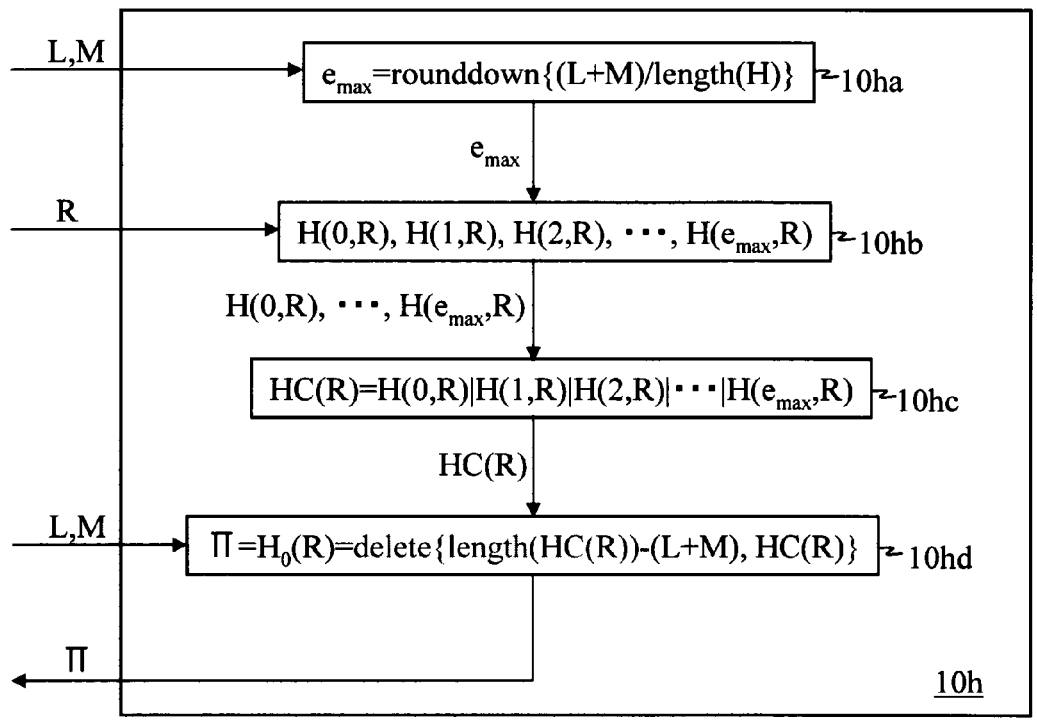
FIG. 4A is a diagram showing a functional configuration of a hash calculator in detail.
Figure 4B:
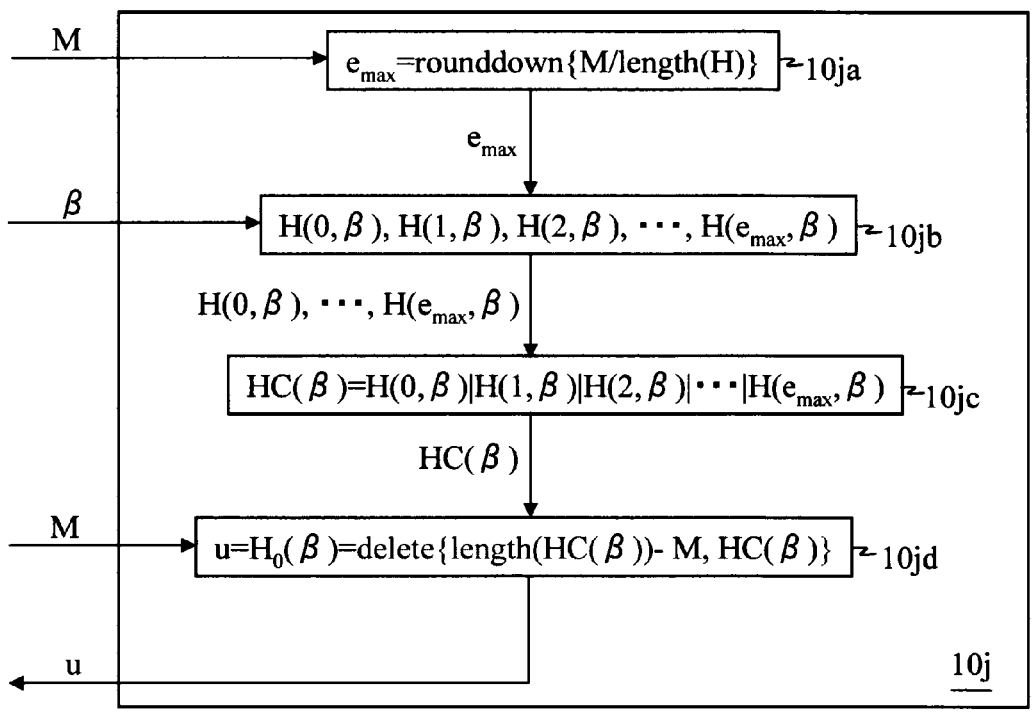
FIG. 4B is a diagram showing a functional configuration of a hash calculator in detail.

FIG. 4A is a diagram showing a functional configuration of the hash calculator 10h in detail, and FIG. 4B is a diagram showing a functional configuration of the hash calculator 10j in detail. As shown in FIG. 4, the hash calculator 10h has a number-of-hash-calculations calculator 10ha, a partial hash calculator 10hb, a bit connecting unit 10hc and a bit deleting unit 10hd. And the hash calculator 10j has a number-of-hash-calculations calculator 10ja, a partial hash calculator 10jb, a bit connecting unit 10jc and a bit deleting unit 10jd.

The storage 10a and the temporary memory 10t correspond to the register 11c, the auxiliary storage device 14 or the RAM 16 shown in FIG. 2 or a storage region formed by a combination of these components, for example. The secrete key generator 10b, the public key generator 10c, the message dividing unit 10e, the arbitrary value generator 10f, the group calculator 10g, the hash calculators 10h, 10i, 10j and 10p, the exclusive-OR calculators 10k and 10n, the bit connecting unit 10m, the integer calculator 10q and the controller 10s are implemented by programs for realizing the respective processings loaded into the CPU 11. The input unit 10d is the input unit 12 driven under the control of the CPU 11 loaded with a predetermined program, and the communication unit 10r is the communication unit 18 driven under the control of the CPU 11 loaded with a predetermined program. The signature generating apparatus 10 performs each processing under the control of the controller 10s. Unless otherwise specified, every piece of data involved with the calculation process is read from or written to the temporary memory 10t.

The programs described above may be of a type capable of serving the function alone or of a type that serves the function by reading another program from a library (not shown). At least part of the programs corresponds to the program that makes a computer perform the function of the signature generating apparatus 10.

<Configuration of Signature Verifying Apparatus 20>

Next, a configuration of the signature verifying apparatus 20 will be described.

[Hardware Configuration]

The signature verifying apparatus 20 has the same hardware configuration as the signature generating apparatus 10 shown in FIG. 2.

[Cooperation between Hardware and Program]

Figure 5:
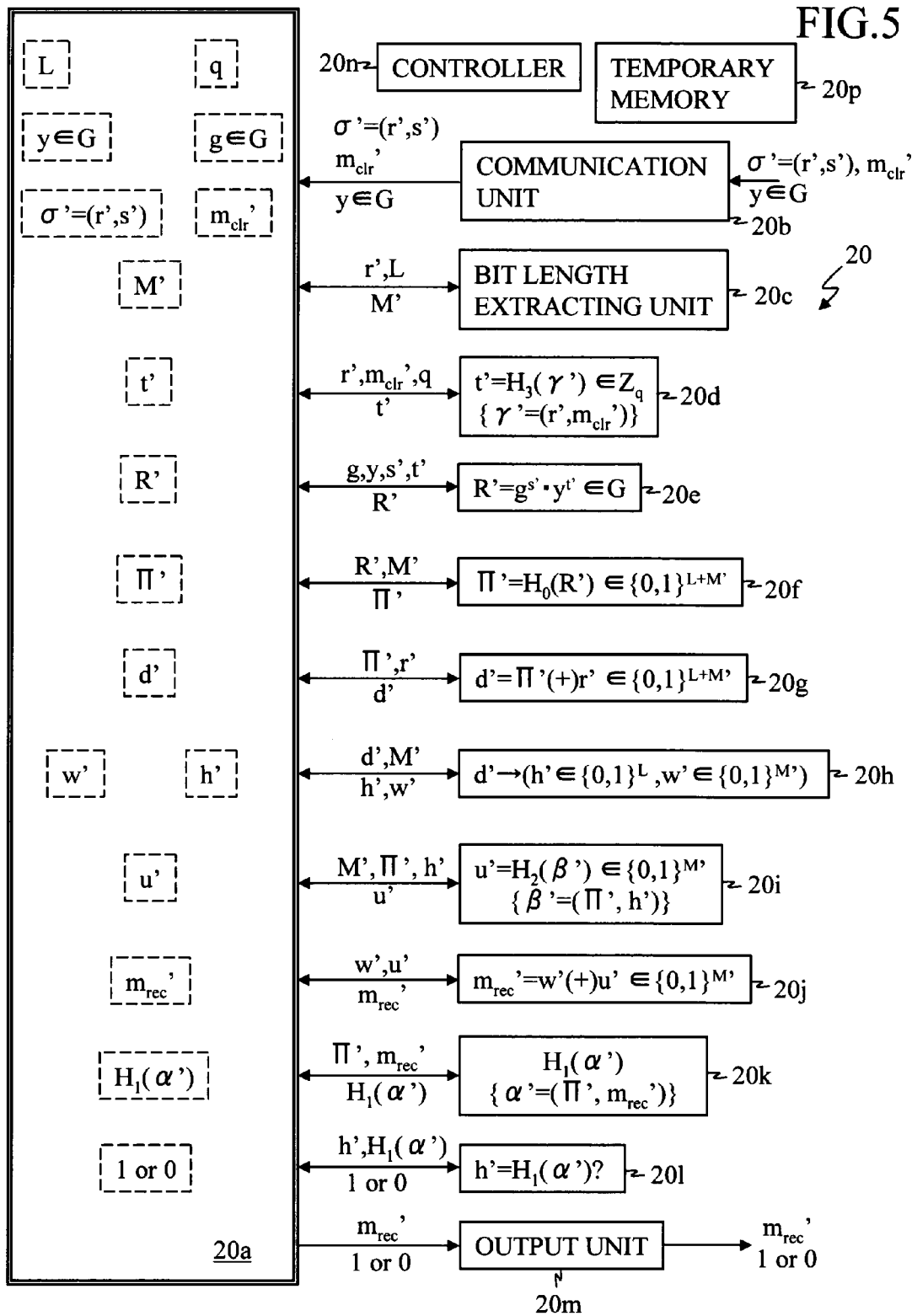
FIG. 5 is a block diagram illustrating a functional configuration of a signature verifying apparatus according to the first embodiment.

The signature verifying apparatus 20 is also implemented by a predetermined program loaded into a computer such as that shown in FIG. 2. FIG. 5 is a block diagram illustrating a functional configuration of the signature verifying apparatus 20 according to the first embodiment thus configured. In FIG. 5, the arrows indicate data flows. However, illustration of flows of data input to or output from a temporary memory 20n or controller 20p are omitted.

As shown in FIG. 5, the signature verifying apparatus 20 according to this embodiment has a storage 20a, a communication unit 20b, a bit length extracting unit 20c, hash calculators 20d, 20f, 20i and 20k, a group calculator 20e, an exclusive-OR calculator 20g, a bit extracting unit 20h, an exclusive-OR calculator 20j, a comparator 20l, an output unit 20m, a controller 20n and a temporary memory 20p.

The storage 20a and the temporary memory 20p correspond to the register, the auxiliary storage device or the RAM of the computer or a storage region formed by a combination of these components, for example. The bit length extracting unit 20c, the hash calculators 20d, 20f, 20i and 20k, the group calculator 20e, the exclusive-OR calculator 20g, the bit extracting unit 20h, the exclusive-OR calculator 20j, the comparator 20l and the controller 20n are implemented by programs for realizing the respective processings loaded into the CPU. The output unit 20m and the communication unit 20b are driven under the control of the CPU loaded with a predetermined program. The signature verifying apparatus 20 performs each processing under the control of the controller 20n. Unless otherwise specified, every piece of data involved with the calculation process is read from or written to the temporary memory 20p.

The programs described above may be of a type capable of serving the function alone or of a type that serves the function by reading another program from a library (not shown). At least part of the programs corresponds to the program that makes a computer perform the function of the signature verifying apparatus 20.

<Processing>

Next, a processing performed in this embodiment will be described.

[Preprocessing]

A cyclic group G of order q used in the signature system 1, where the discrete logarithm problem in the cyclic group G is difficult to solve, and a generator $g \in G$ thereof are determined. The cyclic group G may be a group of rational points on an elliptic curve or a multiplicative group of a finite field. In the case where a group of rational points on an elliptic curve is used, the generator g is a point $g=(g_1, g_2)$ on the elliptic curve. In the case where a multiplicative group of a finite field is used, the generator g is an integer equal to or greater than 2. There are various methods of implementing a group of rational points on an elliptic curve by a computer (for example, "N. Koblitz, Elliptic Curve Cryptosystems, Math. Comp., Vol. 48, No. 17, pp. 203-209, 1987" or "Victor S. Miller, Use of Elliptic Curves in Cryptography, In Advances in Cryptology—CRYPTO '85, Vol. 218 of Lecture Notes in Computer Science, pp. 417-426, Springer, 1986"). In practice, there are various cryptographic methods based on a group of rational points on an elliptic curve that can be implemented by a computer. From the viewpoint of security, the order q is preferably a prime number. However, the order q may not be a prime number if the order q is hard to factorize into prime numbers. In addition, a bit length parameter $L \in Z_{>0}$ (an integer greater than 0) used in the signature system 1 is determined.

In addition, a hash function $H_0: \{0, 1\}^* \to \{0, 1\}^{L+M}$ that provides a variable-length output having an output bit length of L+M bits determined according to the bit length M of a recovery message $m_{rec}$ described later, and a hash function $H_2: \{0, 1\}^* \to \{0, 1\}^M$ that provides a variable-length output having an output bit length of M bits determined according to the bit length M of the recovery message $m_{rec}$. Processings of these hash functions will be described later.

In addition, a hash function $H_1: \{0, 1\}^* \to \{0, 1\}^L$ that outputs an L-bit hash value in response to an input value and a hash function $H_3: \{0, 1\}^* \to Z_q$ that outputs an element of $Z_q$ (a complete system of residues modulo q) in response to an input value are determined. The hash function $H_1$ can be constructed in the same manner as the hash functions $H_0$ and $H_2$, and the hash function $H_3$ can be constructed by performing a residue calculation modulo q for a hash value, such as SHA-1.

Information that identifies the cyclic group G and the hash functions $H_0$ to $H_3$ determined as described above is written in the programs implementing the signature generating apparatus 10 and the signature verifying apparatus 20, and this enables the signature generating apparatus 10 and the signature verifying apparatus 20 to perform calculations determined on the cyclic group G or calculations of the hash functions $H_0$ to $H_3$. The bit length parameter $L \in Z_{>0}$, the order q and the generator $g \in G$ are stored in the storage 10a of the signature generating apparatus 10 and the storage 20a of the signature verifying apparatus 20.

[Key Generation Processing]

Next, a key generation processing performed by the signature generating apparatus 10 will be described.

The secret key generator 10b of the signature generating apparatus 10 generates an arbitrary secret key $x \in Z_q$. Generation of the secret key x may be performed by mapping of a pseudo random number to $Z_q$ or based on a value arbitrarily determined by the person who generates the signature. The generated secret key x is safely stored in the storage 10a of the signature generating apparatus 10. That is, an apparatus external to the signature generating apparatus 10 cannot acquire the secret key x from the storage 10a.

Then, the public key generator 10c of the signature generating apparatus 10 reads the secret key x and the generator $g \in G$ of the cyclic group G from the storage 10a, performs a calculation defined on the cyclic group G according to $$y = g^x \in G \quad (3)$$

to generate a public key $y \in G$ associated with the secret key x, and stores the public key in the storage 10a. In the case where the cyclic group G is a group of rational points on an elliptic curve E, for example, the right side of the expression (3) means a multiplication of the generator $g = (g_1, g_2)$ which is a point on the elliptic curve E, by x on the elliptic curve E (that is, $x \cdot g \in E$), and the public key y is a point on the elliptic curve E. An exemplary specific method of scalar multiplication on an elliptic curve implemented on a computer involves using the dyadic expansion, the sliding window or the like by representing points on the elliptic curve by affine coordinates or projective coordinates (for example, see the reference document 1: Ian F. Blake, Gadiel Serrousi and Nigel P. Smart, "Elliptic Curve Cryptography", published by Pearson Education, ISBN4-89471-431-0). In the case where the cyclic group G is a multiplicative group of a finite field, for example, the right side of the expression (3) means a calculation $g^x$ mod p (where g represents an integer equal to or greater than 2, and p=2q+1), and the public key y is a scalar value. The generated public key y is transmitted from the communication unit 10r to the public key server apparatus 30 via the network 40, and the public key server apparatus 30 presents the received public key y along with a public key certificate, for example. Presentation of the public key y and the like means that the public key y and the like are stored in a storage of the public key server apparatus 30 in such a manner that any apparatus capable of connecting to the network 40 can acquire the public key y and the like stored in the storage of the public key server apparatus 30. The signature verifying apparatus 20 receives the public key y from the public key server apparatus 30 at the communication unit 20b and stores the public key y in the storage 20a.

[Signature Generation Processing]

Next, a signature generation processing according to the first embodiment will be described.

FIG. 6 is a flow chart for illustrating the signature generation processing according to the first embodiment. In the following, the signature generation processing according to this embodiment will be described with reference to FIG. 6.

First, a message $m \in \{0, 1\}^{N+M}$ and the bit length $M(\geq 1)$ of the recovery message are input to the input unit 10d of the signature generating apparatus 10 (FIG. 3) (step S11). The input information is stored in the storage 10a.

Then, the message dividing unit 10e reads the message $m \in \{0, 1\}^{N+M}$ and the bit length $M(\geq 1)$ of the recovery message from the storage 10a. Using the information, the message dividing unit 10e divides the message $m \in \{0, 1\}^{N+M}$ into the recovery message $m_{rec} \in \{0, 1\}^M$ having a bit length of M and a clear message $m_{clr} \in \{0, 1\}^N$ having a bit length of N ($N \geq 0$) (step S12). For example, the higher-order M bits of the message $m \in \{0, 1\}^{N+M}$ constitute the recovery message $m_{rec} \in \{0, 1\}^M$, and the lower-order N bits constitute the clear message $m_{clr} \in \{0, 1\}^N$. The message dividing method is not limited to that described above, and the bits of the message $m \in \{0, 1\}^{N+M}$ that constitute the recovery message $m_{rec}$ and the bits that constitute the clear message $m_{clr}$ can be arbitrarily chosen. The recovery message $m_{rec} \in \{0, 1\}^M$ having the bit length of M and the clear message $m_{clr} \in \{0, 1\}^N$ having the bit length of N generated as a result of the division are stored in the storage 10a.

Then, the arbitrary value generator 10f generates an arbitrary value $k \in Z_q$ and stores the generated arbitrary value k in the storage 10a (step S13). For example, generation of the arbitrary value k is performed by mapping of a pseudo random number to $Z_q$.

Then, the group calculator 10g reads the generator $g \in G$ and the arbitrary value $k \in Z_q$ from the storage 10a, calculates $$R = g^k \in G \quad (4)$$

and outputs the calculation result $R \in G$ to the storage 10a to store the calculation result in the storage 10a (step S14). In the case where the cyclic group G is a group of rational points on an elliptic curve E, for example, the right side of the expression (4) means a multiplication of the generator $g = (g_1, g_2)$ which is a point on the elliptic curve E, by k on the elliptic curve E (that is, $k \cdot g \in E$), and the calculation result R is a point on the elliptic curve E. An exemplary specific method of scalar multiplication on an elliptic curve implemented on a computer involves using the dyadic expansion, the sliding window or the like by representing points on the elliptic curve by affine coordinates or projective coordinates. In the case where the cyclic group G is a multiplicative group of a finite field, for example, the right side of the expression (4) means a calculation $g^k$ mod p, and the calculation result is a scalar value.

Then, the hash calculator 10h reads the calculation result $R \in G$, the bit length M of the recovery message and the bit length parameter L from the storage 10a. The hash calculator 10h applies the hash function $H_0: \{0, 1\}^* \to \{0, 1\}^{L+M}$ having an output bit length of L+M bits determined according to the bit length M of the recovery message $m_{rec}$ to the calculation result R, and outputs the calculation result, that is, the L+M-bit hash value $$\Pi = H_0(R) \in \{0,1\}^{L+M} \quad (5)$$

to the storage 10a to store the calculation result in the storage 10a (step S15). In the case where the cyclic group G is a group of rational points on an elliptic curve E, for example, the right side of the expression (5) means a calculation that applies the hash function $H_0$ to a value that can uniquely or restrictively determine the calculation result R which is a point on the elliptic curve E (for example, a combination of the x and y coordinates of the point R and the signs thereof, the x or y coordinate of the point R, or a bit connection value of the x and y coordinates of the point R). In the case where the cyclic group G is a group of rational points on an elliptic curve E, the expression "apply the hash function $H_0$ to the calculation result R" means to apply the hash function $H_0$ to a value that can uniquely or restrictively determine the calculation result R which is a point on the elliptic curve E. In the case where the cyclic group G is a multiplicative group of a finite field, for example, the right side of the expression (5) means a calculation that applies the hash function $H_o$ to the calculation result R which is a scalar value.

[Example of Processing in Step S15]

Figure 7A:
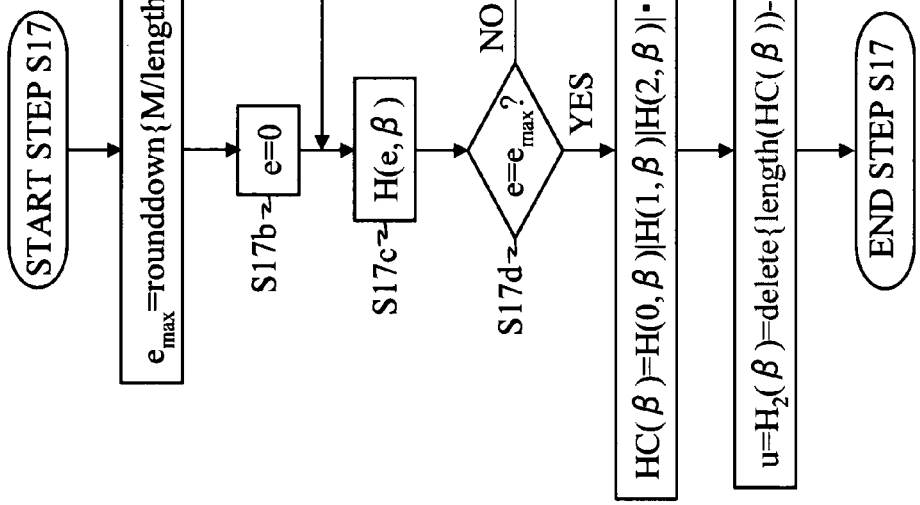
FIG. 7A is a flow chart for illustrating an exemplary processing in step S15.

FIG. 7A is a flow chart for illustrating an example of the processing in step S15.

First, the bit length M of the recovery message and the bit length parameter L are loaded into the number-of-hash-calculations calculator 10*ha*. The number-of-hash-calculations calculator 10*ha* calculates $e_{max}$ according to $$e_{max} = \text{rounddown}\{(L+M)/\text{length}(H)\} \quad (5\text{-}1)$$

and stores $e_{max}$ in the temporary memory 10*t* (step S15*a*). In this expression, rounddown{*} means a calculation that truncates the fractional portion of *, length (*) means the bit length of *, and H means a well-known hash function. For example, the hash function may be SHA-1 (bit length of 160 bits) or MD5 (bit length of 128 bits). For example, if L+M=500, and the hash function H is SHA-1 [length(H)=160], $e_{max}$=3.

Then, the controller 10*s* substitutes 0 in the variable e and stores the variable e in the temporary memory 10*t* (step S15*b*).

Then, the partial hash calculator 10*h* b reads the variable e from the temporary memory 10*t*, reads the calculation result R from the storage 10*a*, calculates a hash value $$H(e, R) \quad (5\text{-}2)$$

and stores the hash value in the temporary memory 10*t* (step S15*c*). In the case where the cyclic group G is a group of rational points on an elliptic curve E, for example, the expression (5-2) means a calculation that applies the hash function H to a bit connection value of the variable e and a value that can uniquely or restrictively determine the calculation result R which is a point on the elliptic curve E (for example, a combination of the x and y coordinates of the point R and the signs thereof, the x or y coordinate of the point R, or a bit connection value of the x and y coordinates of the point R). In the case where the cyclic group G is a multiplicative group of a finite field, for example, the expression (5-2) means a calculation that applies the hash function $H_o$ to a bit connection value of the variable e and the calculation result R which is a scalar value.

Then, the controller 10*s* reads $e_{max}$ and the variable e from the temporary memory 10*t* and determines whether a relationship $$e = e_{max} \quad (5\text{-}3)$$

holds or not (step S15*d*). If the relationship (5-3) does not hold, the controller 10*s* prepares e+1 as a new variable e, stores the new variable e in the temporary memory 10*t* (step S15*e*) and then returns the processing to step S15*c*. On the other hand, if the relationship (5-3) holds, the controller 10*s* issues an instruction to the bit connecting unit 10*hc* to read the hash values H(0, R), H(1, R), H(2, R), . . . , H($e_{max}$, R) from the temporary memory 10*t*, calculates the bit connection value thereof $$HC(R) = H(0,R) | \ldots | H(e_{max}, R) \quad (5\text{-}4)$$

and stores the bit connection value in the temporary memory 10*t* (step S15*f*).

Then, the bit deleting unit 10*h* d reads the bit connection value HC(R), the bit length M of the recovery message and the bit length parameter L from the temporary memory 10*t*, calculates $$\Pi = H_0(R) = \text{delete}\{\text{length}(HC(R)) - (L+M), HC(R)\} \quad (5\text{-}5)$$

and outputs the calculation result to the storage 10*a* (step S15*g*). In this expression, delete{δ, ε} means a processing of deleting the leading δ bits of ε. That is, the expression (5-5) means to delete some leading bits of HC(R) to generate $\Pi = H_0$(R) having a total bit length of L+M.

The processing performed in step S15 is not limited to the processing described above. For example, instead of using the variable e, the bit length of the hash value may be expanded by hash chain. In this case, HC(R) in the expression (5-4) is as follows, for example.

$$HC(R) = H(R) | H(H(R)) | H(H(H(R))) | \ldots | H(H(H \ldots (R) \ldots))$$

(This is the end of the description of "Example of Processing in step S15").

Following step S15, the hash calculator 10*i* reads the hash value Π, the recovery message $m_{rec}$ and the bit length parameter L from the storage 10*a*. The hash calculator 10*i* applies the hash function $H_1: \{0, 1\}^* \to \{0, 1\}^L$ that outputs an L-bit hash value in response to an input value to a value α which depends on the hash value Π and the recovery message $m_{rec}$, and outputs the calculation result, that is, an L-bit hash value $$h = H_1(\alpha) \in \{0,1\}^L \quad (6)$$

to the storage 10*a* to store the hash value in the storage 10*a* (step S16). In the first embodiment, α depends only on the hash value Π and the recovery message $m_{rec}$ (α=(Π, $m_{rec}$)). Although the configuration of α is not limited to a particular one in this embodiment, it is assumed that α has the same configuration as α' (described later) for the signature verifying apparatus 20 described later. For example, α can be configured as follows.

[α-1] a is an L+2M-bit value formed by connecting Π as the higher-order L+M bits and $m_{sec}$ as the lower-order M bits to each other.

[α-2] α is an L+2M-bit value formed by connecting Π as the lower-order L+M bits and $m_{rec}$ as the higher-order M bits to each other.

[α-3] α is an L+2M-bit value formed by connecting $m_{rec}$ as the odd-numbered higher-order M bits and Π as the remaining L+M bits to each other.

Then, the hash calculator 10*j* reads the hash value Π, the hash value h and the bit length M of the recovery message from the storage 10*a*. The hash calculator 10*j* applies the hash function $H_2: \{0, 1\}^* \to \{0, 1\}^M$ having an output bit length of M bits determined according to the bit length M of the recovery message $m_{rec}$ to a value β which depends on the hash value Π and the hash value h, and outputs the calculation result, that is, an M-bit hash value $$u = H_2(\beta) \in \{0,1\}^M \quad (7)$$

to the storage 10*a* to store the calculation result in the storage 10*a* (step S17). In the first embodiment, β depends only on the hash value Π and the hash value h(β=(Π, h)). Although the configuration of β is not limited to a particular one in this embodiment, it is assumed that β has the same configuration as β' (described later) for the signature verifying apparatus 20 described later. For example, β can be configured as follows.

[β-1] β is a 2L+M-bit value formed by connecting Π as the higher-order L+M bits and h as the lower-order L bits to each other.

[β-2] β is a 2L+M-bit value formed by connecting Π as the lower-order L+M bits and h as the higher-order L bits to each other.

[β-3] β is a 2L+M-bit value formed by connecting h as the odd-numbered higher-order L bits and Π as the remaining L+M bits to each other.

[Example of Processing in Step S17]

Figure 7B:
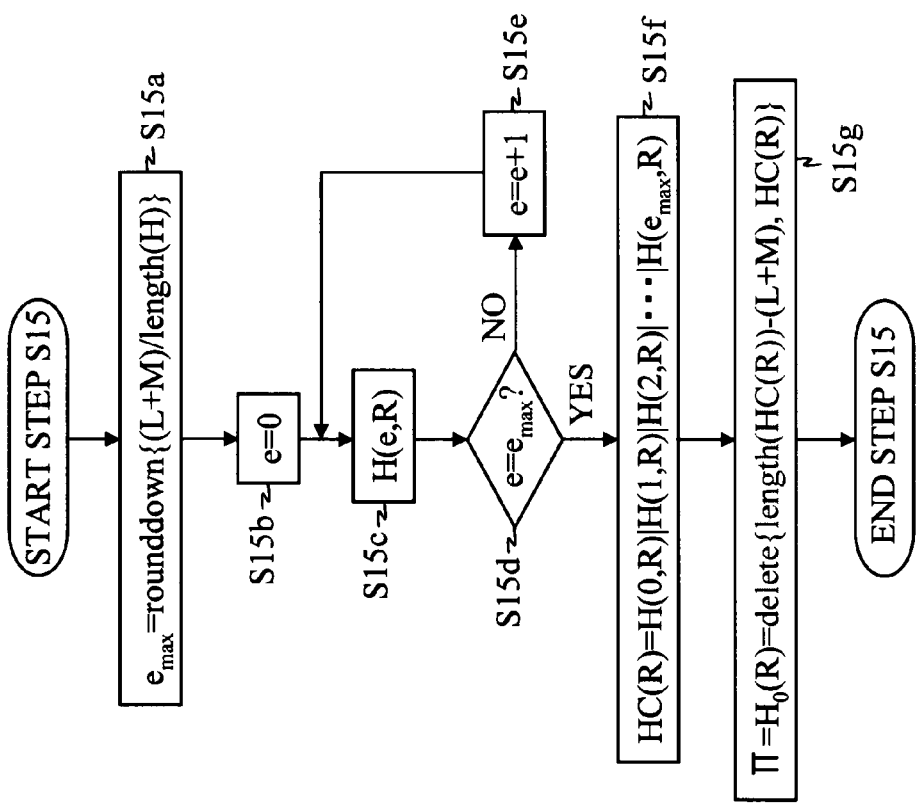
FIG. 7B is a flow chart for illustrating an exemplary processing in step S17.

FIG. 7B is a flow chart for illustrating an example of the processing in step S17.

First, the bit length M of the recovery message is loaded to the number-of-hash-calculations calculator $10ja$. The number-of-hash-calculations calculator $10ja$ calculates $e_{max}$ according to $$e_{max} = \text{rounddown}\{M/\text{length}(H)\} \quad (7\text{-}1)$$

and stores $e_{max}$ in the temporary memory $10t$ (step S17$a$).

Then, the controller $10s$ substitutes 0 in the variable e and stores the variable e in the temporary memory $10t$ (step S17$b$).

Then, the partial hash calculator $10jb$ reads the variable e from the temporary memory $10t$, reads the hash values $\Pi$ and h from the storage $10a$, calculates a hash value $$H(e,\beta), \beta = (\Pi,h) \quad (7\text{-}2)$$

and stores the hash value in the temporary memory $10t$ (step S17$c$).

Then, the controller $10s$ reads $e_{max}$ and the variable e from the temporary memory $10t$ and determines whether a relationship $$e = e_{max} \quad (7\text{-}3)$$

holds or not (step S17$d$). If the relationship (7-3) does not hold, the controller $10s$ prepares e+1 as a new variable e, stores the new variable e in the temporary memory $10t$ (step S17$e$) and then returns the processing to step S17$c$. On the other hand, if the relationship (7-3) holds, the controller $10s$ issues an instruction to the bit connecting unit $10jc$ to read the hash values $H(0, \beta), H(1, \beta), H(2, \beta), \ldots, H(e_{max}, \beta)$ from the temporary memory $10t$, calculates the bit connection value thereof $$HC(\beta) = H(0,\beta)|\ldots|H(e_{max},\beta) \quad (7\text{-}4)$$

and stores the bit connection value in the temporary memory $10t$ (step S17$f$).

Then, the bit deleting unit $10j$ d reads the bit connection value $HC(\beta)$ and the bit length M of the recovery message from the temporary memory $10t$, calculates $$u = H_2(\beta) = \text{delete}\{\text{length}(HC(\beta)) - M, HC(\beta)\} \quad (7\text{-}5)$$

and outputs the calculation result to the storage $10a$ (step S17$g$).

The processing performed in step S17 is not limited to the processing described above. For example, instead of using the variable e, the bit length of the hash value may be expanded by hash chain. (This is the end of the description of "Example of Processing in Step S17").

Following step S17, the exclusive-OR calculator $10k$ reads the recovery message $m_{rec}$ and the hash value u form the storage $10a$. The exclusive-OR calculator $10k$ calculates the exclusive OR of the recovery message $m_{rec}$ and the hash value u according to $$w = m_{rec}(+)u \in \{0,1\}^M \quad (8)$$

,where (+) represents an exclusive-OR operator, and outputs the exclusive OR value w to the storage $10a$ to store the value in the storage $10a$ (step S18).

Then, the bit connecting unit $10m$ reads the hash value $h \in \{0, 1\}^L$ and the exclusive-OR value $w \in \{0, 1\}^M$ from the storage $10a$. The bit connecting unit $10m$ calculates an L+M-bit bit connection value $$d = h|w \in \{0,1\}^{L+M} \quad (9)$$

in which the hash value $h \in \{0, 1\}^L$ is placed at a first bit position and the exclusive-OR value $w \in \{0, 1\}^M$ is placed at a second bit position, and outputs the bit connection value d to the storage $10a$ to store the value in the storage $10a$ (step S19).

Although both the "first bit position" and the "second bit position" are not limited to a particular bit position, the signature generating apparatus 10 and the signature verifying apparatus 20 should determine the first and second bit positions based on the same criterion. FIG. 9 show examples of the first and second bit positions.

Figure 9A:
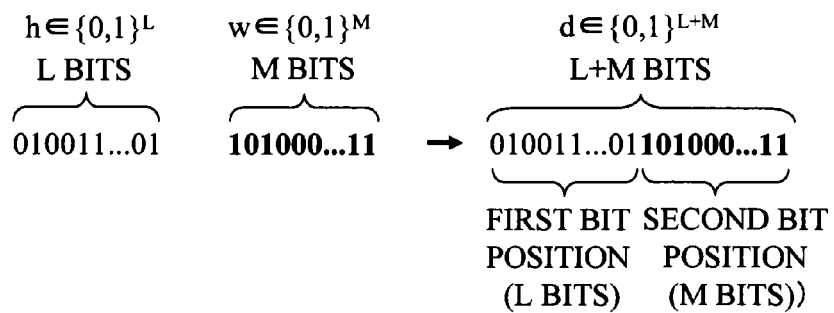
FIG. 9A is a diagram showing an exemplary configuration of a first bit position and a second bit position.
Figure 9B:
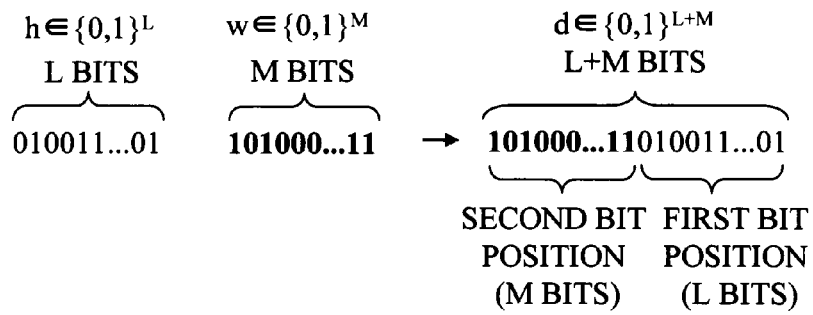
FIG. 9B is a diagram showing another exemplary configuration of the first bit position and the second bit position.
Figure 9C:
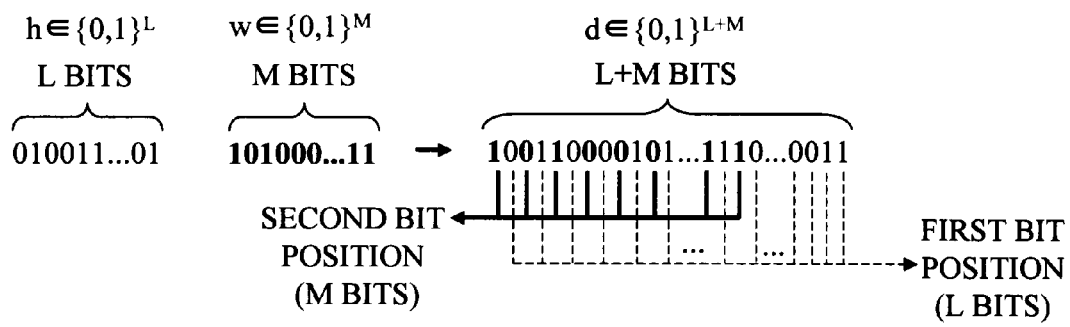
FIG. 9C is a diagram showing another exemplary configuration of the first bit position and the second bit position.

In the example shown in FIG. 9A, L consecutive higher-order bit positions are designated as the first bit position, and M consecutive lower-order bit positions are designated as the second bit position. In the example shown in FIG. 9B, M consecutive higher-order bit positions are designated as the second bit position, and L consecutive lower-order bit positions are designated as the first bit position. In the example shown in FIG. 9C, $L \geq M$, and odd-numbered higher-order M bit positions are designated as the second bit position, and the remaining bit positions are designated as the first bit position.

Then, the exclusive-OR calculator $10n$ reads the hash value $\Pi$ and the bit connection value d from the storage $10a$. The exclusive-OR calculator $10n$ calculates the exclusive OR of the hash value $\Pi$ and the bit connection value d according to $$r = \Pi(+)d \in \{0,1\}^{L+M} \quad (10)$$

and outputs the exclusive-OR value r to the storage $10a$ to store the value in the storage $10a$ (step S20).

Then, the hash calculator $10p$ reads the exclusive-OR value r and the clear message $m_{clr}$ from the storage $10a$. The hash calculator $10p$ applies the hash function $H_3: \{0, 1\}^* \to Z_q$ that outputs an integer in response to an input value to a value $\gamma$ which depends on the exclusive-OR value r and the clear message $m_{clr}$, and outputs the calculation result, that is, a hash value $$t = H_3(\gamma) \in Z_q \quad (11)$$

to the storage $10a$ to store the hash value in the storage $10a$ (step S21). In the first embodiment, $\gamma$ depends only on the exclusive-OR value r and the clear message $m_{clr}$ ($\gamma = (r, m_{clr})$). Although the configuration of $\gamma$ is not limited to a particular one in this embodiment, it is assumed that $\gamma$ has the same configuration as $\gamma'$ (described later) for the signature verifying apparatus 20 described later. For example, $\gamma$ can be configured as follows.

[$\gamma$-1] $\gamma$ is an L+M+N-bit value formed by connecting r as the higher-order L+M bits and $m_{clr}$ as the lower-order N bits to each other.

[$\gamma$-2] $\gamma$ is an L+M+N-bit value formed by connecting r as the lower-order L+M bits and $m_{clr}$ as the higher-order N bits to each other.

[$\gamma$-3] $\gamma$ is an L+M+N-bit value formed by connecting $m_{clr}$ as the odd-numbered higher-order N bits and r as the remaining L+M bits to each other.

Then, the integer calculator $10q$ reads the arbitrary value k, the hash value t and the secret keys x and q from the storage $10a$. The integer calculator $10q$ calculates $$s = k - t \cdot x \in Z_q \quad (12)$$

and outputs the calculation result s to the storage $10a$ to store the result in the storage $10a$ (step S22).

Then, the exclusive-OR value r, the calculation result s and the clear message $m_{clr}$ are loaded into the communication unit $10r$, and the communication unit 1 Or transmits the signature $\sigma = (r, s)$ and the clear message $m_{clr}$ to the signature verifying apparatus 20 through the network 40 (step S23).

[Signature Verification Processing]

Next, a signature verification processing according to the first embodiment will be described.

Figure 8:
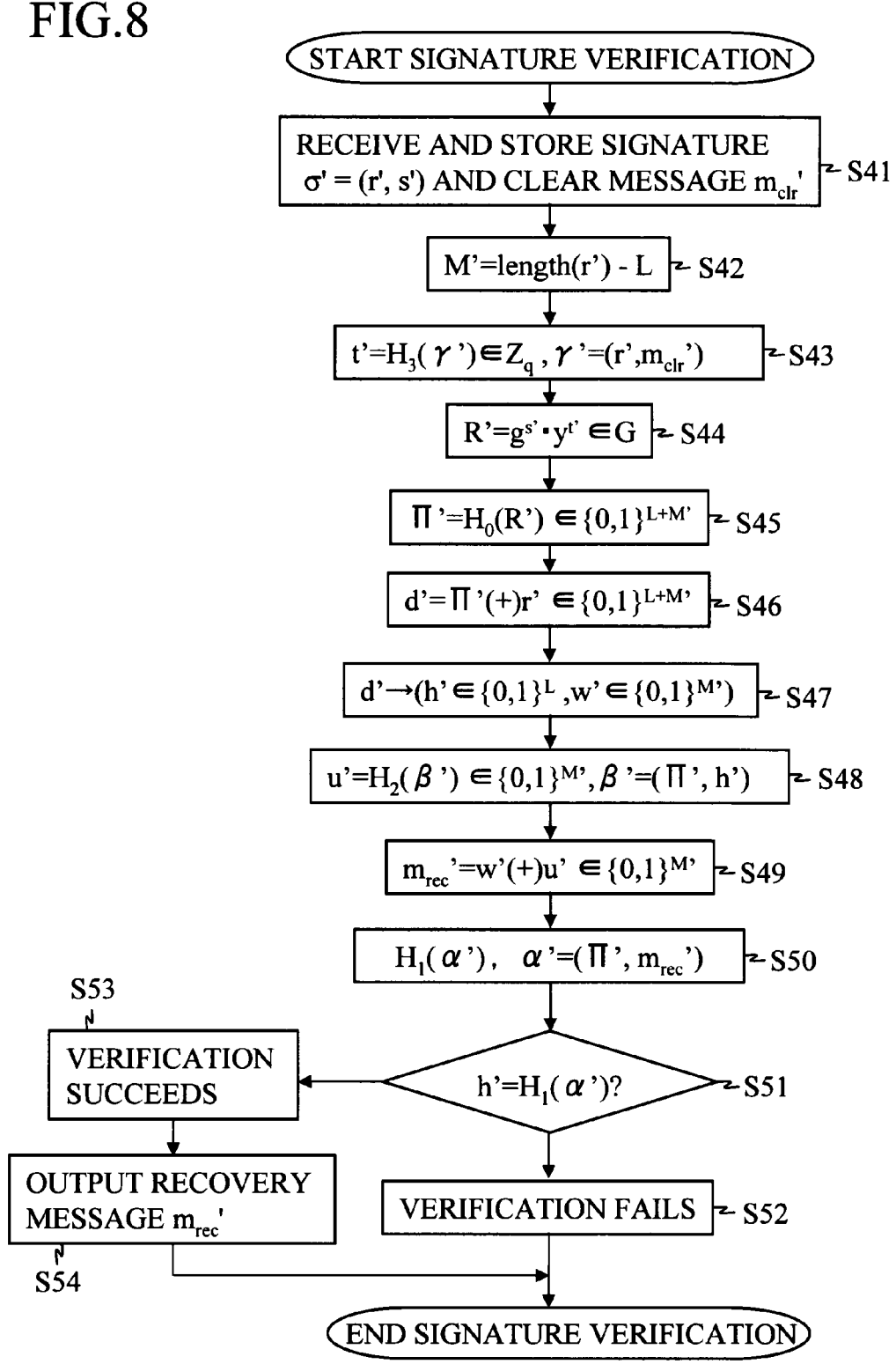
FIG. 8 is a flow chart for illustrating a signature verification processing according to the first embodiment.

FIG. 8 is a flow chart for illustrating the signature verification processing according to the first embodiment. In the following, the signature verification processing according to this embodiment will be described with reference to FIG. 8.

First, the communication unit $20b$ of the signature verifying apparatus $20$ (FIG. 5) receives a signature $\sigma'=(r', s')$ and a clear message $m_{clr}'$ (the expression "receives" corresponds to "accepts input of") and stores the signature and the clear message in the storage $20a$ (step S41). If the signature and the clear message are authorized ones, $\sigma'=(r', s')=\sigma=(r, s)$, and $m_{clr}'=m_{clr}$. However, in this description, the signature to be verified is expressed as $\sigma'=(r', s')$, and the clear message to be verified is expressed as $m_{clr}'$.

Then, the bit length extracting unit $20c$ reads the bit length parameter L and r' of the signature $\sigma'=(r', s')$ from the storage $20a$. The bit length extracting unit $20c$ calculates the bit length M' of a recovery message $m_{rec}'$ associated with the signature $\sigma'$ according to $$M'=\text{length}(r')-L \quad (13)$$

and stores the bit length M' in the storage $20a$ (step S42).

Then, the hash calculator $20d$ reads r', the clear message $m_{clr}'$ and q from the storage $20a$. The hash calculator $20d$ applies the hash function $H_3: \{0, 1\}^* \rightarrow Z_q$, where the hash function $H_3$ is the same as the hash function $H_3$ used in the signature generating apparatus $10$, to a value $\gamma'$ which depends on r' and $m_{clr}'$, and outputs the calculation result, that is, $$t'=H_3(\gamma') \quad (14)$$

to the storage $20a$ to store the calculation result in the storage $20a$ (step S43). $\gamma'$ has the same configuration as $\gamma$ in the signature generating apparatus $10$ described above (if r=r', and $m_{clr}=m_{clr}'$).

Then, the group calculator $20e$ reads the generator g∈G, the public key y∈G of the signature generating apparatus $10$, s' of the signature $\sigma'$ and the hash value t' from the storage $20a$, calculates R' according to $$R'=g^{s'}\cdot y^{t'} \in G \quad (15)$$

and outputs the calculation result R' to the storage $20a$ to store the calculation result R' in the storage $20a$ (step S44). In the case where the cyclic group G is a group of rational points on an elliptic curve E, for example, the right side of the expression (15) means a calculation that multiplies the generator $g=(g_1, g_2)$ by s' on the elliptic curve E, multiplies the public key $y=(y_1, y_2)$ by t' on the elliptic curve E and sums the multiplication results on the elliptic curve E (s'·g+t'·y∈E), and the calculation result R' is a point on the elliptic curve E. An exemplary specific method of scalar multiplication on an elliptic curve implemented on a CPU involves using the dyadic expansion, the sliding window or the like by representing points on the elliptic curve by affine coordinates or projective coordinates. In the case where the cyclic group G is a multiplicative group of a finite field, for example, the right side of the expression (15) means a calculation $g^{s'}\cdot y^{t'}$ mod p, and the calculation result R' is a scalar value.

Then, the hash calculator $20f$ reads the calculation result R'∈G, the bit length M' of the recovery message $m_{rec}'$ and the bit length parameter L from the storage $20a$. The hash calculator $20f$ applies the hash function $H_0: \{0, 1\}^* \rightarrow \{0, 1\}^{L+M'}$, where the hash function $H_0$ is the same as the hash function $H_0$ used in the signature generating apparatus $10$, to the calculation result R', and outputs the calculation result, that is, an L+M'-bit hash value $$\Pi'=H_0(R') \in \{0,1\}^{L+M'} \quad (16)$$

to the storage $20a$ to store the hash value in the storage $20a$ (step S45). Calculation of $H_0(R')$ is the same as in the signature generating apparatus $10$ (if R=R').

Then, the exclusive-OR calculator $20g$ reads the hash value $\Pi'$ and r' of the signature $\sigma'$ from the storage $20a$, calculates the exclusive OR thereof $$d'=\Pi'(+)r' \in \{0,1\}^{L+M'} \quad (17)$$

and outputs the exclusive-OR value d' to the storage $20a$ to store the value in the storage $20a$ (step S46).

Then, the bit extracting unit $20h$ reads the exclusive-OR value d' and the bit length M' of the recovery message $m_{rec}'$ from the storage $20a$. The bit extracting unit $20h$ extracts an L-bit value $h' \in \{0, 1\}^L$ at the first bit position of the exclusive-OR value d' and an M'-bit value $w' \in \{0, 1\}^{M'}$ at the second bit position of the exclusive-OR value d', and stores the values in the storage $20a$ (step S47). The first bit position and the second bit position are the same as the first bit position and the second bit position in the processing in the signature generating apparatus $10$ (if d=d').

Then, the hash calculator $20i$ reads the hash value $\Pi'$, a value h' and the bit length M' of the recovery message $m_{rec}'$ from the storage $20a$. The hash calculator $20i$ applies the hash function $H_2: \{0, 1\}^* \rightarrow \{0, 1\}^M$, which is the same as the hash function $H_2$ used in the signature generating apparatus $10$, to a value $\beta'$ which depends on the hash value $\Pi'$ and the value h', and outputs the calculation result, that is, an M'-bit hash value $$u'=H_2(\beta') \in \{0,1\}^{M'} \quad (18)$$

to the storage $20a$ to store the hash value in the storage $20a$ (step S48). $\beta'$ has the same configuration as $\beta$ in the signature generating apparatus $10$ described above (if $\Pi=\Pi'$, and h=h').

The exclusive-OR calculator $20j$ reads the value $w' \in \{0, 1\}^{M'}$ and the hash value u' from the storage $20a$. The exclusive-OR calculator $20j$ calculates the exclusive OR of the value w' and the hash value u' according to $$m_{rec}'=w'(+)u' \in \{0,1\}^{M'} \quad (19)$$

and outputs the calculation result, that is, the recovery message $m_{rec}' \in \{0, 1\}^{M'}$ to the storage $20a$ to store the recovery message in the storage $20a$ (step S49).

Then, the hash calculator $20k$ reads the hash value $\Pi'$ and the recovery message $m_{rec}'$ from the storage $20a$. The hash calculator $20k$ applies the hash function $H_1: \{0, 1\}^* \rightarrow \{0, 1\}^L$, which is the same as the hash function $H_1$ used in the signature generating apparatus $10$, to a value $\alpha'$ which depends on the hash value $\Pi'$ and the recovery message $m_{rec}'$, and outputs the calculation result, that is, an L-bit hash value $$H_1(\alpha') \in \{0,1\}^L \quad (20)$$

to the storage $20a$ to store the hash value in the storage $20a$ (step S50). $\alpha'$ has the same configuration as $\alpha$ in the signature generating apparatus $10$ described above (if $\Pi=\Pi'$, and $m_{rec}=m_{rec}'$).

Then, the comparator $20l$ reads the hash value $H_1(\alpha')$ and the value h' from the storage $20a$, and determines whether the relationship $$h'=H_1(\alpha') \quad (21)$$

holds or not (step S51).

If the relationship (21) does not hold, the comparator $20l$ outputs a value 0 (indicating that verification failed) to the storage $20a$ to store the value in the storage $20a$, and the output unit $20m$ outputs the value 0 (indicating that verification failed) received from the storage $20a$ (step S52). On the other hand, if the relationship (21) holds, the comparator $20l$ outputs a value 1 (indicating that verification succeeded) to store the value in the storage $20a$, and the output unit $20m$ outputs the value 1 (indicating that verification succeeded) received form the storage 20a (step S53) and outputs the recovery message $m_{rec}$' (step S54).

Second Embodiment

Next, a second embodiment of the present invention will be described. The second embodiment differs from the first embodiment in that the clear message is not used. The following description will be mainly focused on differences from the first embodiment, and description of the things that are the same as in the first embodiment will be omitted.

<General Configuration>

In the signature system 1 according to the first embodiment, the signature generating apparatus 10 is replaced with a signature generating apparatus 110, and the signature verifying apparatus 20 is replaced with a signature verifying apparatus 120.

<Configuration of Signature Generating Apparatus 110>

Next, a configuration of the signature generating apparatus 110 will be described.

[Hardware Configuration]

The signature generating apparatus 110 has the same hardware configuration as the signature generating apparatus 10 according to the first embodiment.

[Cooperation Between Hardware and Program]

The signature generating apparatus 110 is also implemented by a predetermined program loaded into a computer.

Figure 10:
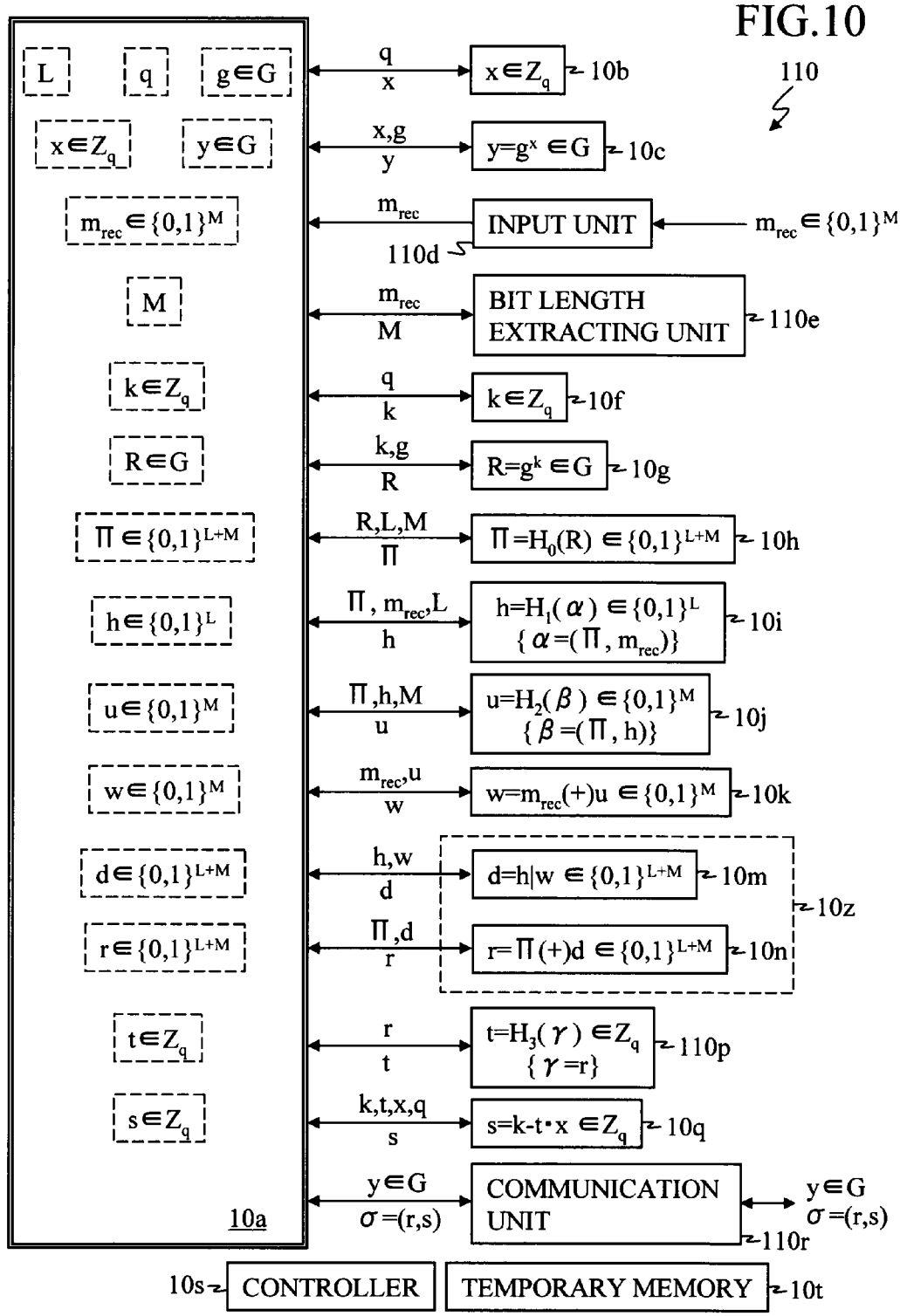
FIG. 10 is a block diagram illustrating a functional configuration of a signature generating apparatus according to a second embodiment.

FIG. 10 is a block diagram illustrating a functional configuration of the signature generating apparatus 110 according to the second embodiment thus configured. In the signature generating apparatus 110, the same parts as those in the signature generating apparatus 10 are denoted by the same reference numerals as those in FIG. 3, and description thereof will be simplified or omitted.

As shown in FIG. 10, the signature generating apparatus 110 according to this embodiment has the storage 10a, the secret key generator 10b, the public key generator 10c, an input unit 110d, a bit length extracting unit 110e, the arbitrary value generator 10f, the group calculator 10g, the hash calculators 10h, 10i and 10j, a hash calculator 110p, the exclusive-OR calculators 10k and 10n, the bit connecting unit 10m, the integer calculator 10q, a communication unit 110r, the controller 10s and the temporary memory 10t.

The bit length extracting unit 110e and the hash calculator 110p are implemented by programs for realizing the respective processings loaded into the CPU. The input unit 110d is driven under the control of the CPU loaded with a predetermined program, and the communication unit 110r is driven under the control of the CPU loaded with a predetermined program.

The programs described above may be of a type capable of serving the function alone or of a type that serves the function by reading another program from a library (not shown). At least part of the programs corresponds to the program that makes a computer perform the function of the signature generating apparatus 110.

<Configuration of Signature Verifying Apparatus 120>

Next, a configuration of the signature verifying apparatus 120 will be described.

[Hardware Configuration]

The signature verifying apparatus 120 has the same hardware configuration as the signature verifying apparatus 20 according to the first embodiment.

[Cooperation Between Hardware and Program]

Figure 11:
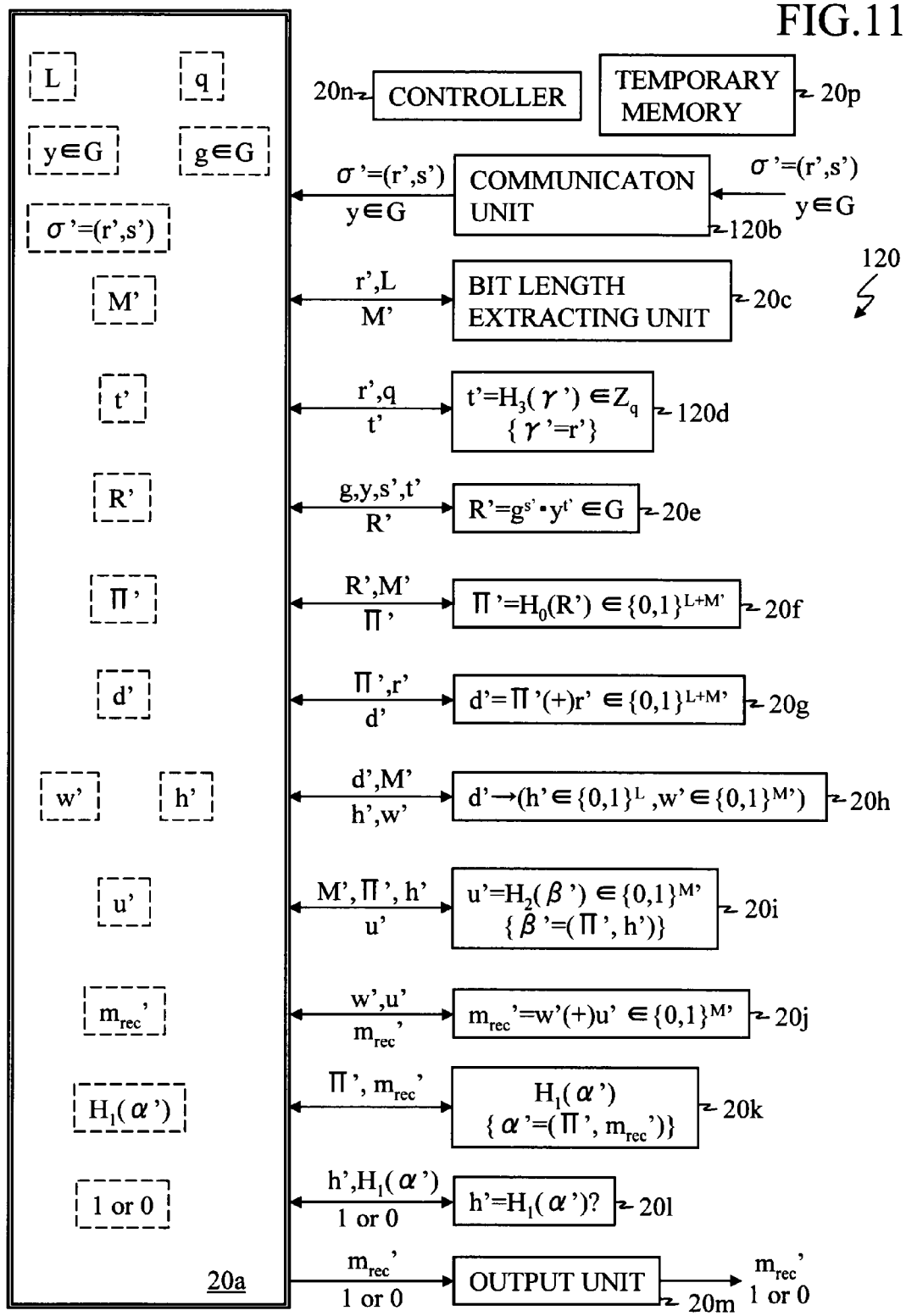
FIG. 11 is a block diagram illustrating a functional configuration of a signature verifying apparatus according to the second embodiment.

The signature verifying apparatus 120 is also implemented by a predetermined program loaded into a computer. FIG. 11 is a block diagram illustrating a functional configuration of the signature verifying apparatus 120 according to the second embodiment thus configured.

As shown in FIG. 11, the signature verifying apparatus 120 according to this embodiment has the storage 20a, a communication unit 120b, the bit length extracting unit 20c, a hash calculator 120d, the hash calculators 20f, 20i and 20k, the group calculator 20e, the exclusive-OR calculator 20g, the bit extracting unit 20h, the exclusive-OR calculator 20j, the comparator 20l, the output unit 20m, the controller 20n and the temporary memory 20p.

The hash calculator 120d is implemented by a program for realizing the processing loaded into the CPU. The communication unit 120b is driven under the control of the CPU loaded with a predetermined program. The programs described above may be of a type capable of serving the function alone or of a type that serves the function by reading another program from a library (not shown). At least part of the programs corresponds to the program that makes a computer perform the function of the signature verifying apparatus 120.

<Processing>

Next, a processing performed in this embodiment will be described.

[Preprocessing and Key Generation Processing]

The preprocessing and the key generation processing are the same as those in the first embodiment.

[Signature Generation Processing]

Next, a signature generation processing according to the second embodiment will be described.

FIG. 12 is a flow chart for illustrating the signature generation processing according to the second embodiment. In the following, the signature generation processing according to this embodiment will be described with reference to FIG. 12.

First, a recovery message $m_{rec} \in \{0, 1\}^M$ is input to the input unit 110d of the signature generating apparatus 110 (FIG. 10) (step S111). The input recovery message $m_{rec}$ is stored in the storage 10a. In the second embodiment, $m=m_{rec}$.

Then, the bit length extracting unit 110e reads the recovery message $m_{rec} \in \{0, 1\}^M$ from the storage 10a, extracts the bit length M of the recovery message and stores the bit length M in the storage 10a (step S112).

Then, the signature generating apparatus 110 performs steps S113 to S120, which are the same as steps S13 to S20 in the first embodiment, and then, the hash calculator 110p reads the exclusive-OR value r from the storage 10a. The hash calculator 110p applies the hash function $H_3$: $\{0, 1\}^* \to Z_q$, which is the same as the hash function $H_3$ in the first embodiment, to a value γ which depends on the exclusive-OR value r, and outputs the calculation result, that is, a hash value $$t = H_3(\gamma) \in Z_q \qquad (22)$$

to the storage 10a to store the hash value in the storage 10a (step S121). In the second embodiment, γ is a value that depends only on the exclusive-OR value r (γ=r). Although the configuration of γ is not limited to a particular one in this embodiment, it is assumed that γ has the same configuration as γ' (described later) for the signature verifying apparatus 120 described later.

Then, the integer calculator 10q reads the arbitrary value k, the hash value t and the secret keys x and q from the storage 10a, calculates s according to the expression (12) described above, and outputs the calculation result s to the storage 10a to store the calculation result s in the storage 10a (step S122).

Then, the exclusive-OR value r and the calculation result s are loaded into the communication unit 110r, and the communication unit 110r transmits the signature σ=(r, s) to the signature verifying apparatus 120 through the network 40 (step S123).

[Signature Verification Processing]

Next, a signature verification processing according to the second embodiment will be described.

Figure 13:
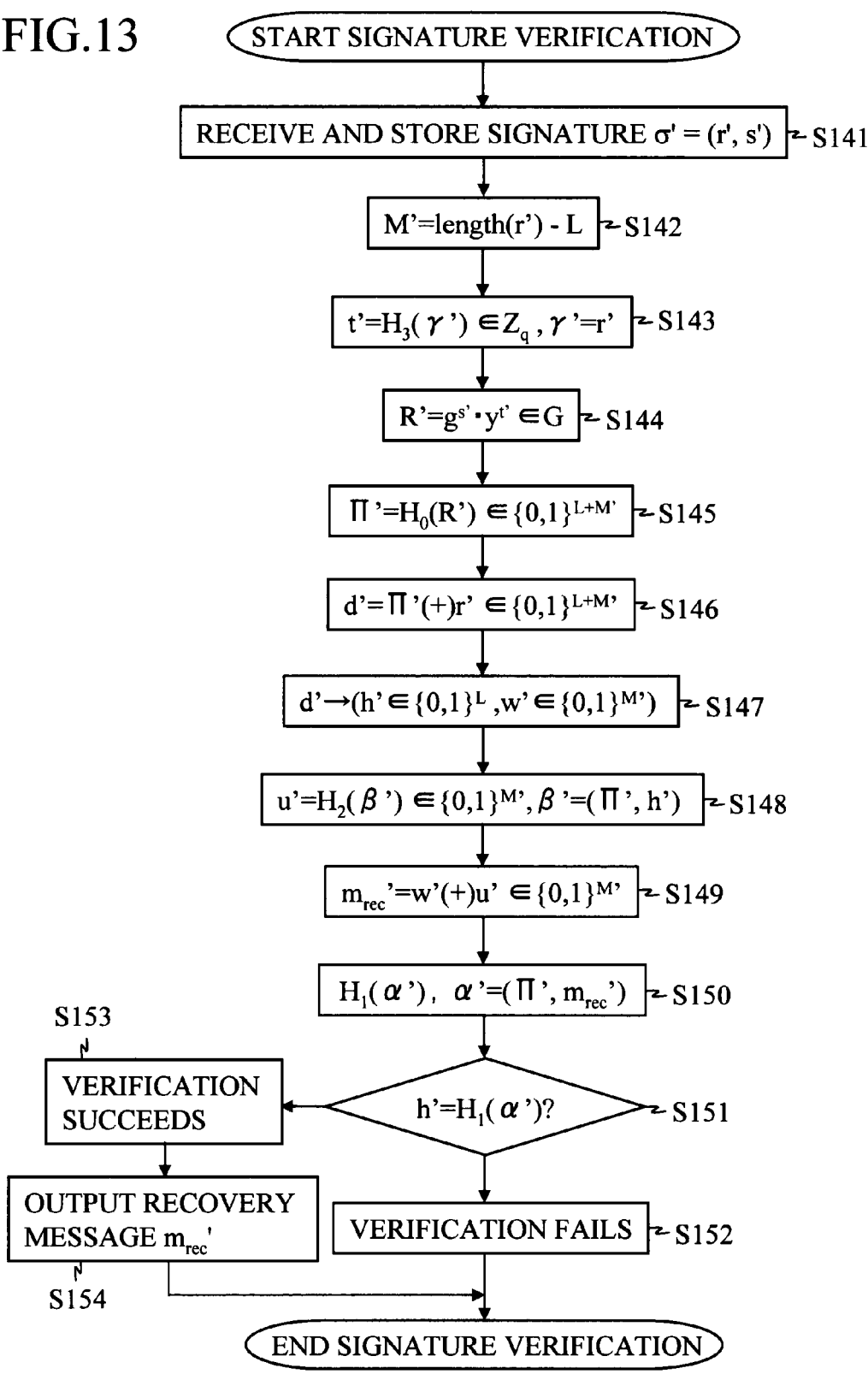
FIG. 13 is a flow chart for illustrating a signature verification processing according to the second embodiment.

FIG. 13 is a flow chart for illustrating the signature verification processing according to the second embodiment. In the following, the signature verification processing according to this embodiment will be described with reference to FIG. 13.

First, the communication unit 120b of the signature verifying apparatus 120 (FIG. 11) receives the signature σ'=(r', s') (the expression "receives" corresponds to "accepts input of") and stores the signature in the storage 20a (step S141).

Then, the bit length extracting unit 20c reads the bit length parameter L and r' of the signature σ'=(r', s') from the storage 20a, calculates the bit length M' of the recovery message $m_{rec}'$ associated with the signature σ' according to the expression (13) described above and stores the bit length M' in the storage 20a (step S142).

Then, the hash calculator 120d reads r' and q from the storage 20a. The hash calculator 120d applies the hash function $H_3: \{0, 1\}^* \rightarrow Z_q$, where the hash function $H_3$ is the same as the hash function $H_3$ used in the signature generating apparatus 110, to the value y' which depends on r', and outputs the calculation result, that is, the hash value $$t' = H_3(\gamma') \tag{23}$$

to the storage 20a to store the hash value in the storage 20a (step S143). γ' has the same configuration as γ in the signature generating apparatus 110 described above (if r=r').

Then, the same steps as steps S44 to S54 in the first embodiment are performed to achieve signature verification (steps S144 to S154).

Third Embodiment

Next, a third embodiment of the present invention will be described. This embodiment is a modification of the first embodiment and differs from the first embodiment in that r of the signature σ=(r, s) is simplified. More specifically, although $r = H_0(R)(+)(H_1(H_0(R), m_{rec})|m_{rec}(+)H_2(H_0(R), H_1(H_0(R), m_{rec})))$ in the first embodiment, $r = H_1(R, m_{rec})|m_{rec}(+)H_2(R, m_{rec}))$ in the third embodiment. As a result, the amount of calculation is reduced. The following description will be mainly focused on differences from the first embodiment, and description of the things that are the same as in the first embodiment will be omitted.

<General Configuration>

In the signature system 1 according to the first embodiment, the signature generating apparatus 10 is replaced with a signature generating apparatus 210, and the signature verifying apparatus 20 is replaced with a signature verifying apparatus 220.

<Configuration of Signature Generating Apparatus 210>

Next, a configuration of the signature generating apparatus 210 will be described.

[Hardware Configuration]

The signature generating apparatus 210 has the same hardware configuration as the signature generating apparatus 10 according to the first embodiment.

[Cooperation Between Hardware and Program]

The signature generating apparatus 210 is also implemented by a predetermined program loaded into a computer.

Figure 14:
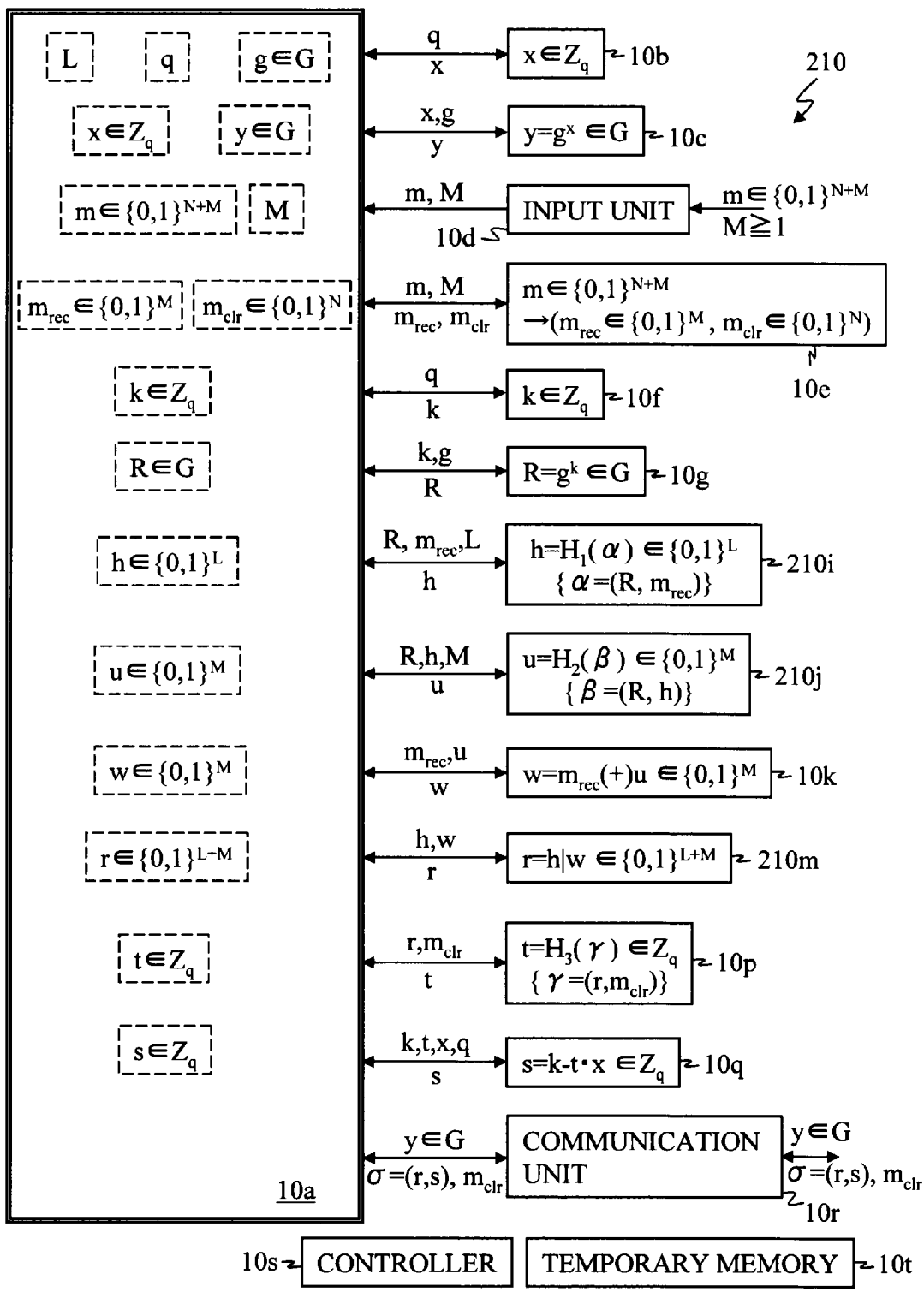
FIG. 14 is a block diagram illustrating a functional configuration of a signature generating apparatus according to a third embodiment.

FIG. 14 is a block diagram illustrating a functional configuration of the signature generating apparatus 210 according to the third embodiment thus configured. In the signature generating apparatus 210, the same parts as those in the signature generating apparatus 10 are denoted by the same reference numerals as those in FIG. 3, and description thereof will be simplified or omitted.

As shown in FIG. 14, the signature generating apparatus 210 according to this embodiment has the storage 10a, the secret key generator 10b, the public key generator 10c, the input unit 10d, the message dividing unit 10e, the arbitrary value generator 10f, the group calculator 10g, hash calculators 210i and 210j, the hash calculator 10p, the exclusive-OR calculator 10k, a bit connecting unit 210m, the integer calculator 10q, the communication unit 10r, the controller 10s and the temporary memory 10t.

The hash calculators 210i, 210j and 10p and the bit connecting unit 210m are implemented by programs for realizing the respective processings loaded into the CPU.

The programs described above may be of a type capable of serving the function alone or of a type that serves the function by reading another program from a library (not shown). At least part of the programs corresponds to the program that makes a computer perform the function of the signature generating apparatus 210.

<Configuration of Signature Verifying Apparatus 220>

Next, a configuration of the signature verifying apparatus 220 will be described.

[Hardware Configuration]

The signature verifying apparatus 220 has the same hardware configuration as the signature verifying apparatus 20 according to the first embodiment.

[Cooperation Between Hardware and Program]

Figure 15:
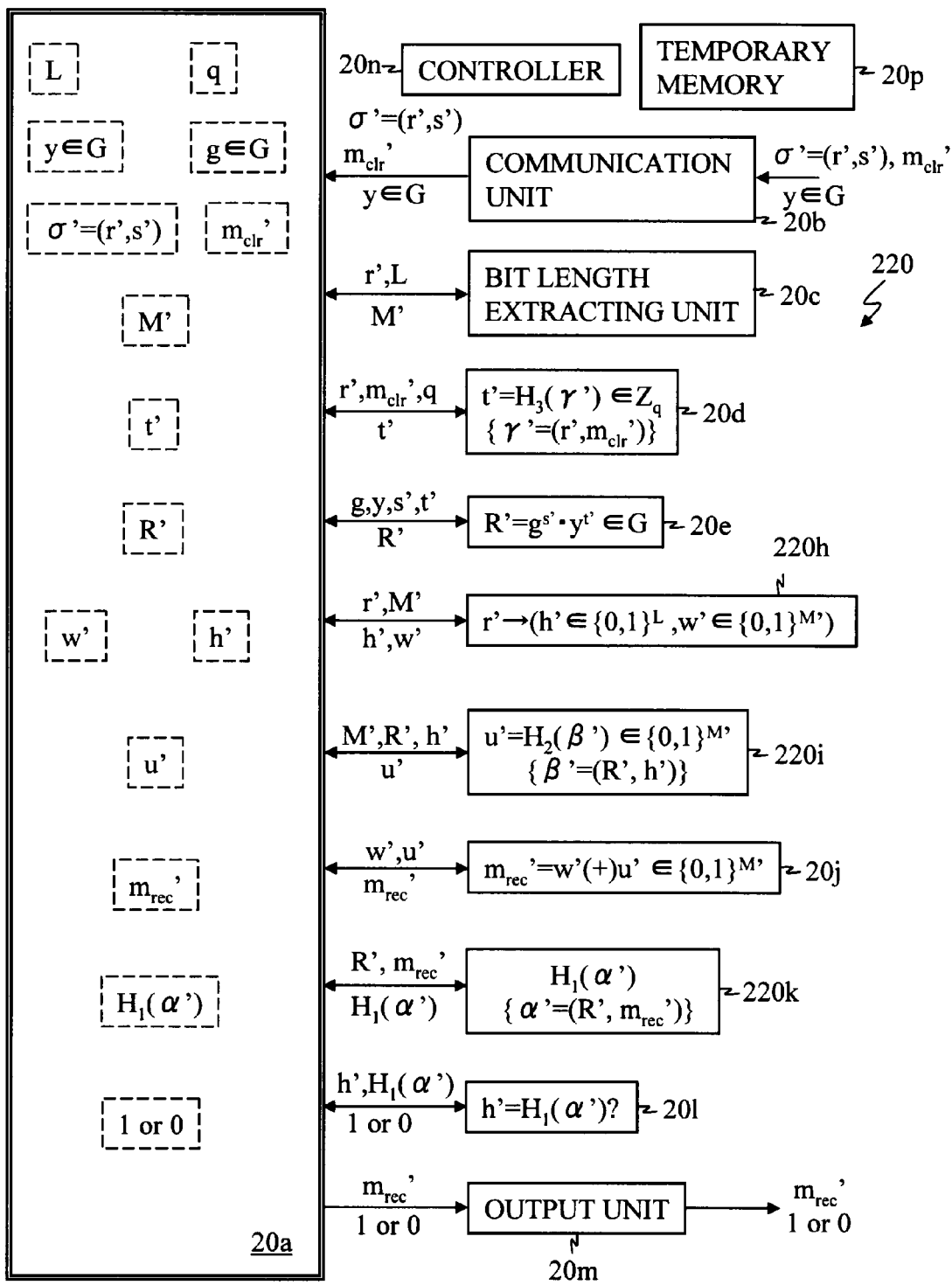
FIG. 15 is a block diagram illustrating a functional configuration of a signature verifying apparatus according to the third embodiment.

The signature verifying apparatus 220 is also implemented by a predetermined program loaded into a computer. FIG. 15 is a block diagram illustrating a functional configuration of the signature verifying apparatus 120 according to the third embodiment thus configured.

As shown in FIG. 15, the signature verifying apparatus 220 according to this embodiment has the storage 20a, the communication unit 20b, the bit length extracting unit 20c, the hash calculator 20d, hash calculators 220i and 220k, the group calculator 20e, a bit extracting unit 220h, the exclusive-OR calculator 20j, the comparator 20l, the output unit 20m, the controller 20n and the temporary memory 20p.

The hash calculators 220i and 220k and the comparator 20l are implemented by programs for realizing the respective processings loaded into the CPU. The programs described above may be of a type capable of serving the function alone or of a type that serves the function by reading another program from a library (not shown). At least part of the programs corresponds to the program that makes a computer perform the function of the signature verifying apparatus 220.

<Processing>

Next, a processing performed in this embodiment will be described.

[Preprocessing]

The preprocessing in this embodiment differs from that in the first embodiment in that the hash function $H_0$ is not used.

[Key Generation Processing]

The key generation processing is the same as that in the first embodiment.

[Signature Generation Processing]

Next, a signature generation processing according to the third embodiment will be described.

Figure 16:
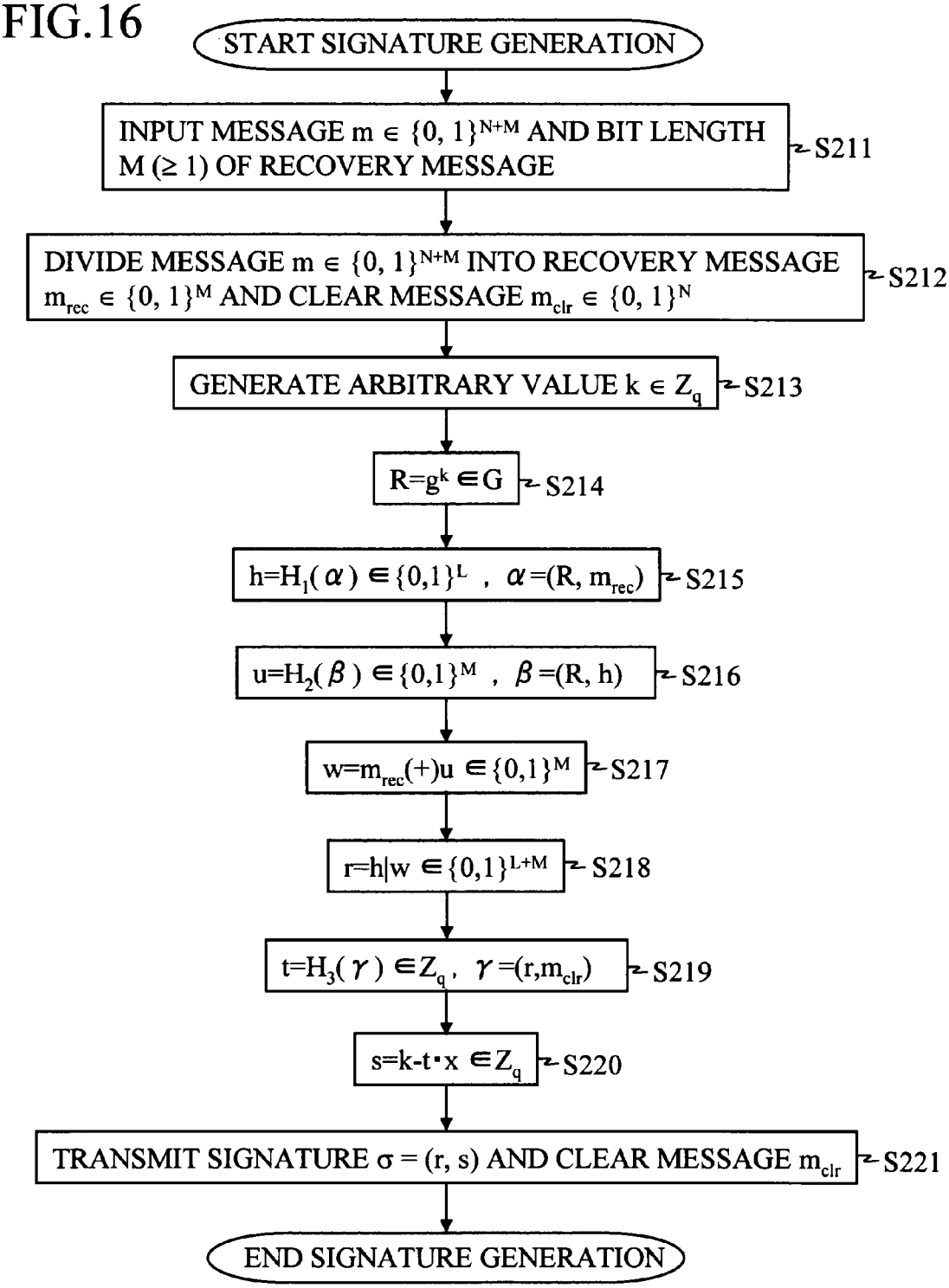
FIG. 16 is a flow chart for illustrating a signature generation processing according to the third embodiment.

FIG. 16 is a flow chart for illustrating the signature generation processing according to the third embodiment. The following description will be mainly focused on differences from the first embodiment.

First, the signature generating apparatus 210 performs the same steps as steps S11 to S14 in the first embodiment (steps S211 to S214). Then, the hash calculator 10i reads the calculation result R in step S214, the recovery message $m_{rec}$ and the bit length parameter L from the storage 10a. The hash calculator 10i applies the hash function $H_1: \{0, 1\}^* \to \{0, 1\}^L$, where the hash function $H_1$ outputs an L-bit hash value in response to an input value, to a value $\alpha$ which depends on the calculation result R and the recovery message $m_{rec}$ (expression (6)), and outputs the calculation result, that is, an L-bit hash value h to the storage 10a to store the hash value in the storage 10a (step S215). In the third embodiment, $\alpha$ is a value that depends only on the calculation result $R \in G$ and the recovery message $m_{rec}$ ($\alpha=(R, m_{rec})$). In the case where the cyclic group G is a multiplicative group of a finite field, the configuration of $\alpha$ in this embodiment is the same as that in the first embodiment except that $\Pi$ is replaced with R. In the case where the cyclic group G is a group of rational points on an elliptic curve E, the configuration of $\alpha$ in this embodiment is the same as that in the first embodiment except that $\Pi$ is replaced with a value that can uniquely or restrictively determine the calculation result R, which is a point on the elliptic curve E (for example, a combination of the x and y coordinates of the point R and the signs thereof, the x or y coordinate of the point R, or a bit connection value of the x and y coordinates of the point R).

Then, the hash calculator 210j reads the calculation result R, the hash value h and the bit length M of the recovery message from the storage 10a. The hash calculator 210j applies the hash function $H_2: \{0, 1\}^* \to \{0, 1\}^M$ having an output bit length of M bits determined according to the bit length M of the recovery message $m_{rec}$ to t a value $\beta$, where the value $\beta$ depends on the calculation result and the hash value h (expression (7)), and R an outputs the calculation result, that is, an M-bit hash value u to the storage 10a to store the hash value in the storage 10a (step S216). In the third embodiment, $\beta$ is a value that depends only on the calculation result R and the hash value h ($\beta=(R, h)$). In the case where the cyclic group G is a multiplicative group of a finite field, the configuration of $\beta$ in this embodiment is the same as that in the first embodiment except that $\Pi$ is replaced with R. In the case where the cyclic group G is a group of rational points on an elliptic curve E, the configuration of $\beta$ in this embodiment is the same as that in the first embodiment except that $\Pi$ is replaced with a value that can uniquely or restrictively determine the calculation result R, which is a point on the elliptic curve E (for example, the x or y coordinate of the point R, or a bit connection value of the x and y coordinates of the point R).

Then, the exclusive-OR calculator 10k reads the recovery message $m_{rec}$ and the hash value u from the storage 10a. The exclusive-OR calculator 10k calculates the exclusive-OR value w of the recovery message $m_{rec}$ and the hash value u (according to the expression (8)), and outputs the exclusive OR value w to the storage 10a to store the value in the storage 10a (step S217).

Then, the bit connecting unit 210m reads the hash value $h \in \{0, 1\}^L$ and the exclusive-OR value $w \in \{0, 1\}^M$ from the storage 10a. The bit connecting unit 210m calculates an L+M-bit bit connection value $$r = h | w \in \{0,1\}^{L+M} \quad (24)$$

in which the hash value $h \in \{0, 1\}^L$ is placed at the first bit position and the exclusive-OR value $w \in \{0, 1\}^M$ is placed at the second bit position, and outputs the bit connection value r to the storage 10a to store the value in the storage 10a (step S218). The first bit position and the second bit position are the same as in the first embodiment.

Then, the same steps as steps S21 to S23 in the first embodiment are performed (steps S219 to S221).

[Signature Verification Processing]

Next, a signature verification processing according to the third embodiment will be described.

Figure 17:
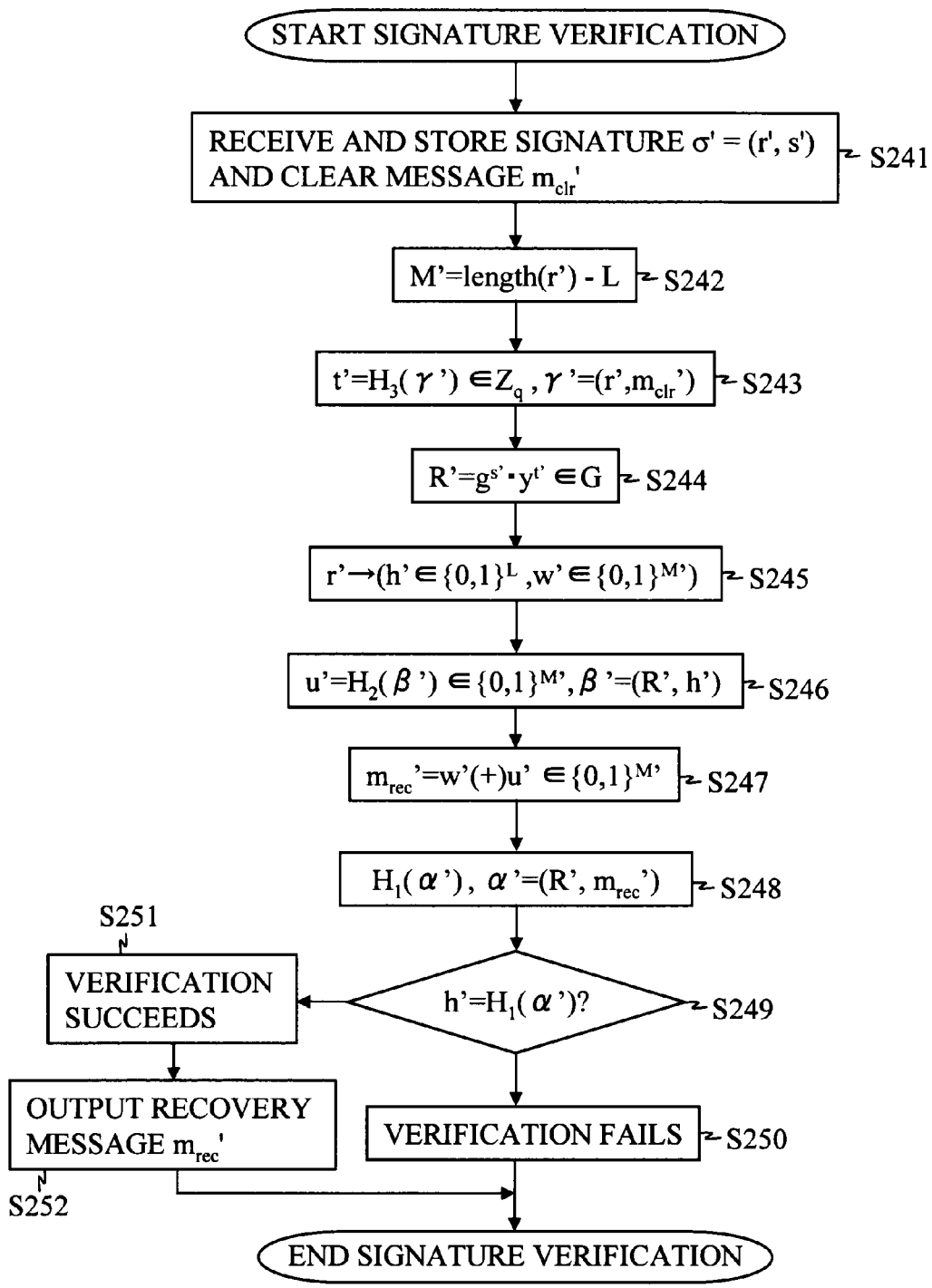
FIG. 17 is a flow chart for illustrating a signature verification processing according to the third embodiment.

FIG. 17 is a flow chart for illustrating the signature verification processing according to the third embodiment. The following description will be mainly focused on differences from the first embodiment.

First, the signature verifying apparatus 220 performs the same steps as steps S41 to S44 in the first embodiment (steps S241 to S244).

Then, the bit extracting unit 220h reads r' of the signature $\sigma'=(r', s')$ and the bit length M' of the recovery message $m_{rec}'$ from the storage 20a. The bit extracting unit 220h extracts an L-bit value $h' \in \{0, 1\}^L$ at the first bit position of r' and an M'-bit value $w' \in \{0, 1\}^{M'}$ at the second bit position of r', and stores the values in the storage 20a (step S245). The first bit position and the second bit position are the same as the first bit position and the second bit position in the processing in the signature generating apparatus 210 (if d=d').

Then, the hash calculator 220i reads the calculation result R' in step S244, the value h' and the bit length M' of the recovery message $m_{rec}'$ from the storage 20a. The hash calculator 220i applies the hash function $H_2: \{0, 1\}^* \to \{0, 1\}^{M'}$, which is the same as the hash function $H_2$ used in the signature generating apparatus 210, to a value $\beta'$ which depends on the calculation result R' and the value h', (expression (18)), and outputs the calculation result, that is, an M'-bit hash value u' to the storage 20a to store the hash value in the storage 20a (step S246). $\beta'$ has the same configuration as $\beta$ in the signature generating apparatus 210 (if $\Pi=\Pi'$, and h=h').

Then, the exclusive-OR calculator 20j reads the value $w' \in \{0, 1\}^{M'}$ and the hash value u' from the storage 20a. The exclusive-OR calculator 20j calculates the exclusive OR of the value w' and the hash value u' (according to the expression (10)), and outputs the calculation result, that is, the recovery message $m_{rec}' \in \{0, 1\}^{M'}$ to the storage 20a to store the recovery message in the storage 20a (step S247).

Then, the hash calculator 220k reads the calculation result R' and the recovery message $m_{rec}'$ from the storage 20a. The hash calculator 220k applies the hash function $H_1: \{0, 1\}^* \to \{0, 1\}^L$, which is the same as the hash function $H_1$ used in the signature generating apparatus 210, to a value $\alpha'$ which depends on the calculation result R' and the recovery message $m_{rec}'$, and outputs the calculation result, that is, an L-bit hash value (expression (20)) to the storage 20a to store the hash value in the storage 20a (step S248). $\alpha'$ has the same configuration as $\alpha$ in the signature generating apparatus 210 (if $\Pi=\Pi'$, and $m_{rec}=m_{rec}'$).

Then, the same steps as steps S51 to S54 in the first embodiment are performed (steps S249 to S252).

Fourth Embodiment

Next, a fourth embodiment of the present invention will be described. This embodiment is a modification of the third embodiment. The fourth embodiment differs from the third embodiment in that the clear message is not used. The following description will be mainly focused on differences from the first to third embodiments, and description of the things that are the same as in the first to third embodiments will be omitted.

<General Configuration>

In the signature system 1 according to the first embodiment, the signature generating apparatus 10 is replaced with a signature generating apparatus 310, and the signature verifying apparatus 20 is replaced with a signature verifying apparatus 320.

<Configuration of Signature Generating Apparatus 310>

Next, a configuration of the signature generating apparatus 310 will be described.

[Hardware Configuration]

The signature generating apparatus 310 has the same hardware configuration as the signature generating apparatus 10 according to the first embodiment.

[Cooperation Between Hardware and Program]

Figure 18:
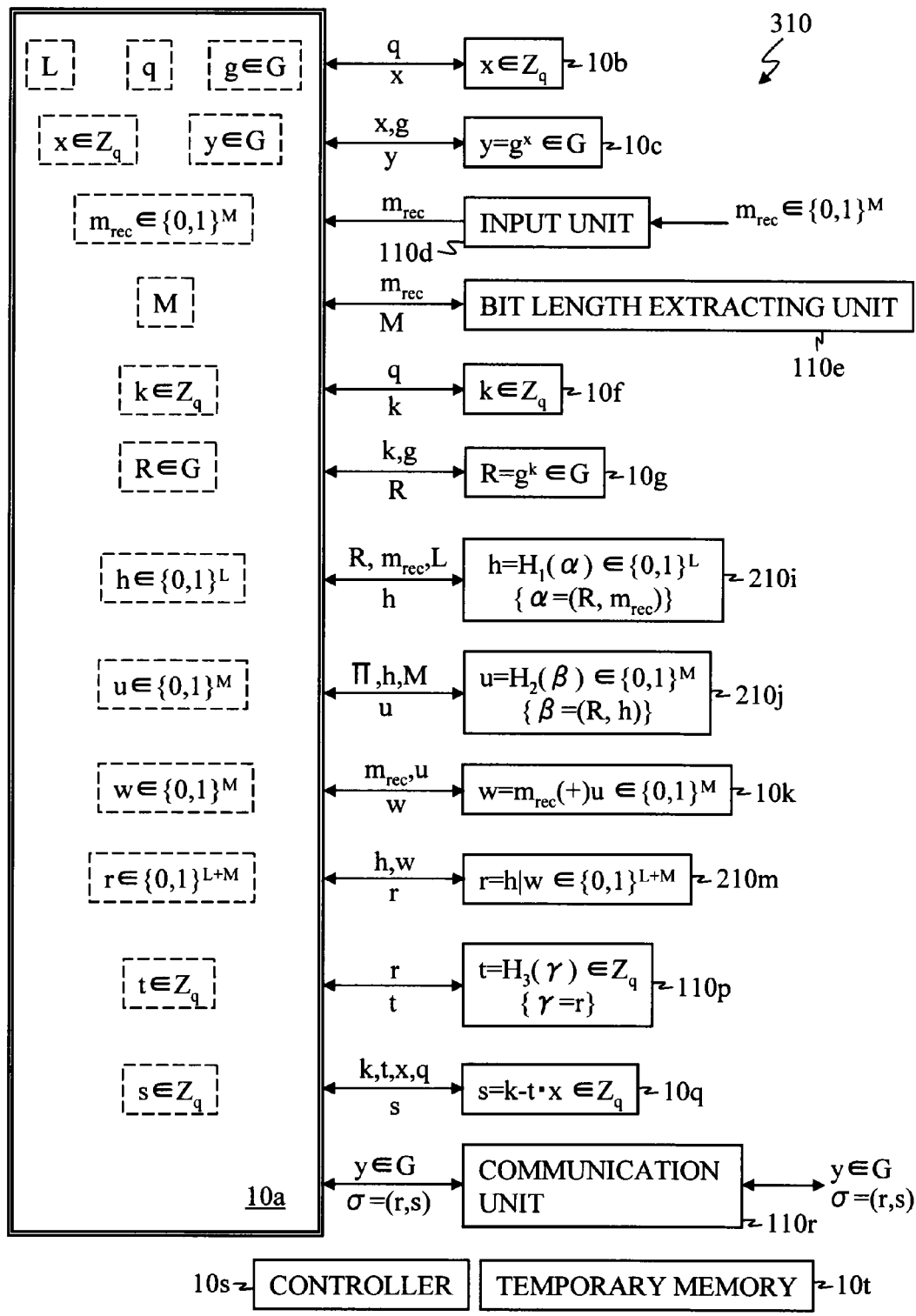
FIG. 18 is a block diagram illustrating a functional configuration of a signature generating apparatus according to a fourth embodiment.

The signature generating apparatus 310 is also implemented by a predetermined program loaded into a computer. FIG. 18 is a block diagram illustrating a functional configuration of the signature generating apparatus 310 according to the fourth embodiment thus configured. In the signature generating apparatus 310, the same parts as those in the signature generating apparatuses 10, 110 and 210 are denoted by the same reference numerals as those in FIGS. 3, 10 and 14, and description thereof will be simplified or omitted.

As shown in FIG. 18, the signature generating apparatus 310 according to this embodiment has the storage 10*a*, the secret key generator 10*b*, the public key generator 10*c*, the input unit 110*d*, the bit length extracting unit 110*e*, the arbitrary value generator 10*f*, the group calculator 10*g*, the hash calculators 210*i*, 210*j* and 110*p*, the exclusive-OR calculator 10*k*, the bit connecting unit 210*m*, the integer calculator 10*q*, the communication unit 110*r*, the controller 10*s* and the temporary memory 10*t*.

<Configuration of Signature Verifying Apparatus 320>

Next, a configuration of the signature verifying apparatus 320 will be described.

[Hardware Configuration]

The signature verifying apparatus 320 has the same hardware configuration as the signature verifying apparatus 20 according to the first embodiment.

[Cooperation Between Hardware and Program]

Figure 19:
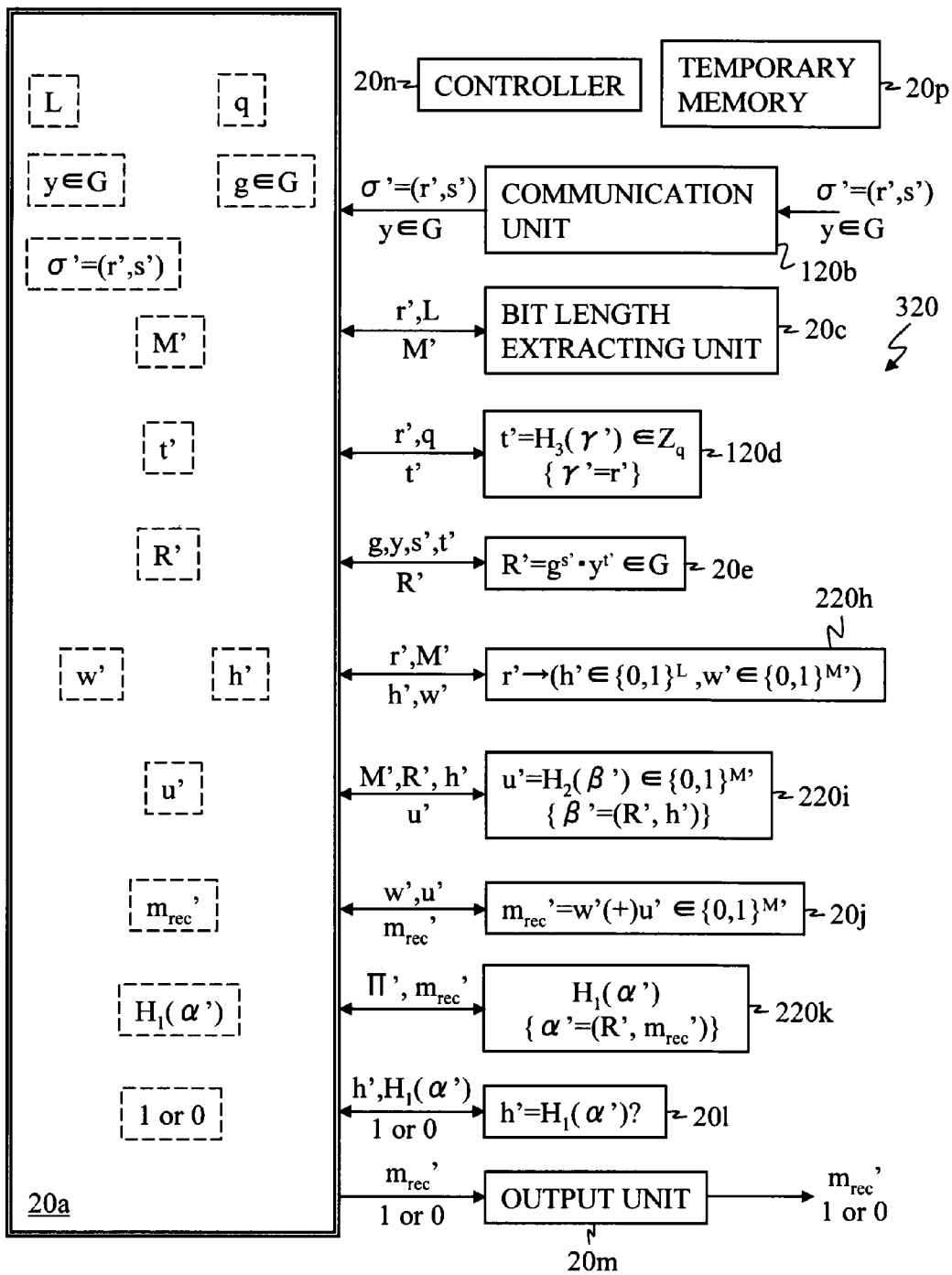
FIG. 19 is a block diagram illustrating a functional configuration of a signature verifying apparatus according to the fourth embodiment.

The signature verifying apparatus 320 is also implemented by a predetermined program loaded into a computer. FIG. 19 is a block diagram illustrating a functional configuration of the signature verifying apparatus 320 according to the fourth embodiment thus configured. In the signature verifying apparatus 320, the same parts as those in the signature verifying apparatuses 20, 120 and 220 are denoted by the same reference numerals as those in FIGS. 5, 11 and 15, and description thereof will be simplified or omitted.

As shown in FIG. 19, the signature verifying apparatus 320 according to this embodiment has the storage 20*a*, the communication unit 120*b*, the bit length extracting unit 20*c*, the hash calculators 120*d*, 220*i* and 220*k*, the group calculator 20*e*, the bit extracting unit 220*h*, the exclusive-OR calculator 20*j*, the comparator 20*l*, the output unit 20*m*, the controller 20*n* and the temporary memory 20*p*.

<Processing>

Next, a processing performed in this embodiment will be described.

[Preprocessing and Key Generation Processing]

The preprocessing and the key generation processing are the same as those in the first embodiment.

[Signature Generation Processing]

Next, a signature generation processing according to the fourth embodiment will be described.

Figure 20:
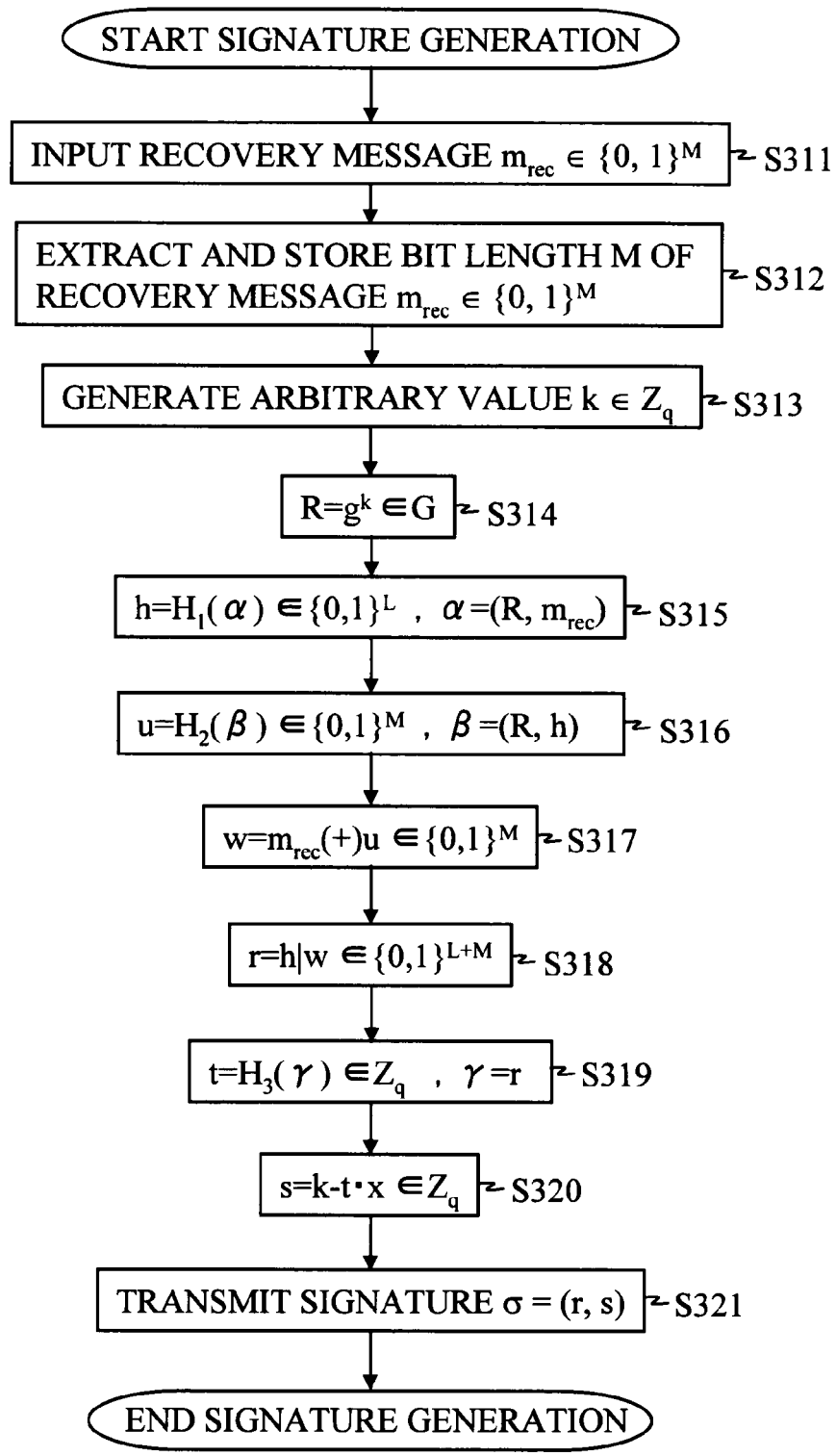
FIG. 20 is a flow chart for illustrating a signature generation processing according to the fourth embodiment.

FIG. 20 is a flow chart for illustrating the signature generation processing according to the fourth embodiment. In the following, the signature generation processing according to this embodiment will be described with reference to FIG. 20.

The signature generating apparatus 310 first performs the same steps as steps S111 to S114 in the second embodiment (steps S311 to S314) and then performs the same steps as steps S215 to S218 in the third embodiment (steps S315 to S318). Then, the signature generating apparatus 310 performs the same steps as steps S121 to S123 in the second embodiment (steps S319 to S321).

[Signature Verification Processing]

Next, a signature verification processing according to the fourth embodiment will be described.

Figure 21:
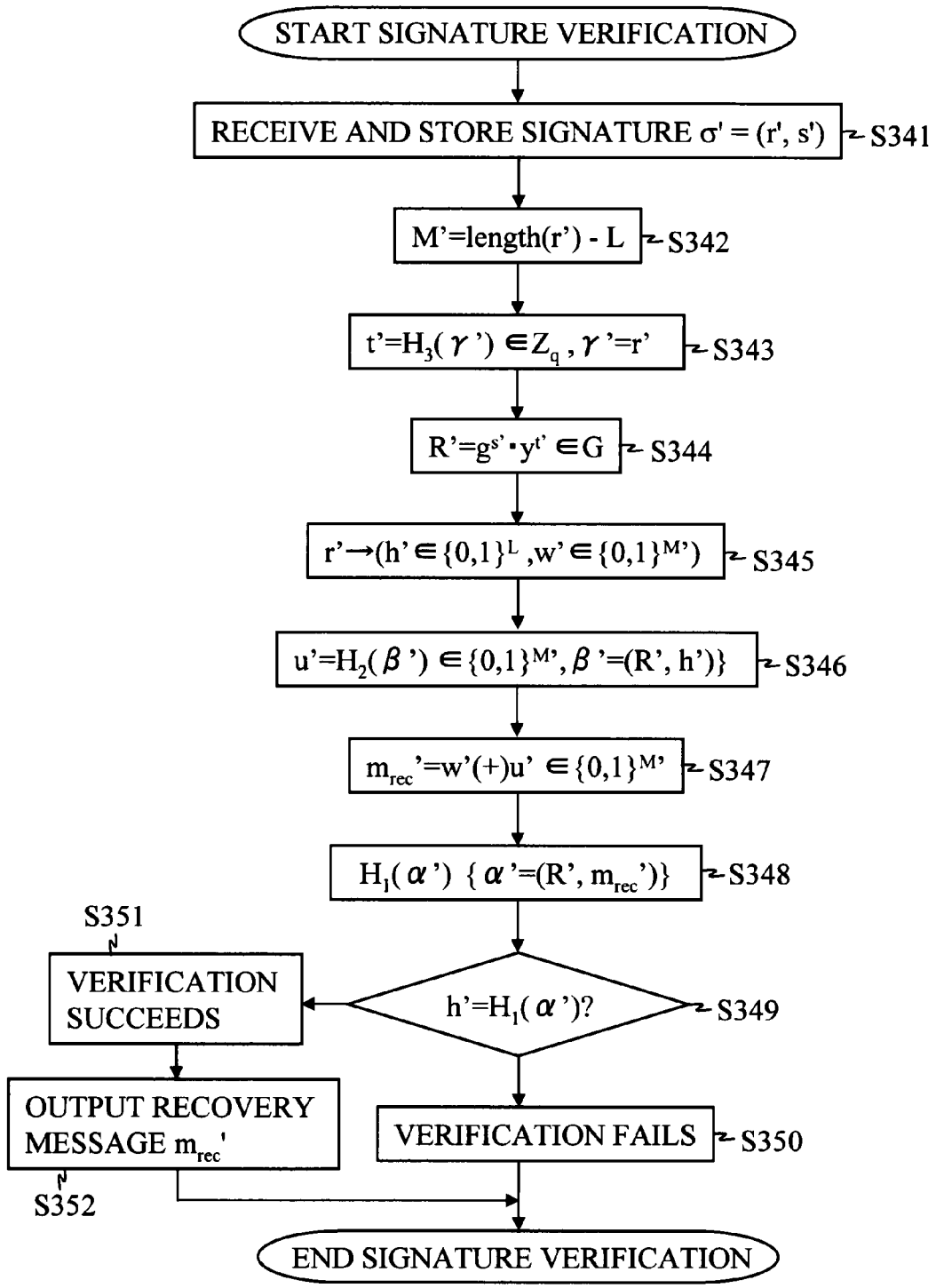
FIG. 21 is a flow chart for illustrating a signature verification processing according to the fourth embodiment.

FIG. 21 is a flow chart for illustrating the signature verification processing according to the fourth embodiment. In the following, the signature verification processing according to this embodiment will be described with reference to FIG. 21.

The signature verifying apparatus 320 first performs the same steps as steps S141 to S144 in the second embodiment (steps S341 to S344) and then performs the same steps as steps S245 to S252 in the third embodiment (steps S345 to S352).

[Basis for Adequacy of Signature Verification]

Next, the reason why the signature is appropriately verified by the processings by the signature verifying apparatuses 20, 120, 220 and 320 will be described.

First and Second Embodiments

Using the signature $\sigma'=(r', s')$, the signature verifying apparatuses 20 and 120 calculate the hash value $t'=H_3(\gamma')$ from the value $\gamma'$ that depends on $r'$ (according to the expressions (14) and (23)), calculate the value $R'=g^{s'}\cdot y^{t'} \in G$ (according to the expression (15)), and calculate the hash value $\Pi'=H_0(R')$ (according to the expression (16)). If the signature $\sigma'$ is an authorized signature, $r'=r$, and $s'=s$ ($s=k-t\cdot x \in Z$), so that $\gamma'=\gamma$, $t'=H_3(\gamma')=H_3(\gamma)=t$, and $y=g^x \in G$, and therefore, $R'=g^{s'}\cdot y^{t'}=g^s\cdot y^t=g^{k-t\cdot x}\cdot g^{t\cdot x}=g^k \in G$. Therefore, $\Pi'=H_0(R')=H_0(g^k)=\Pi$.

In addition, the signature verifying apparatuses 20 and 120 determine the exclusive-OR value $d'=\Pi'(+)r'$ (according to the expression (17)). If the signature $\sigma'$ is an authorized signature, $r'=r$, $r=\Pi(+)d$, and $\Pi'=\Pi$, so that $d'=d$. Furthermore, the signature verifying apparatuses 20 and 120 determine the hash value $u'=H_2(\beta')$ for the value $\beta'$ that depends on the hash value $\Pi'$ and the L-bit value $h' \in \{0,1\}^L$ at the first bit position of the exclusive-OR value $d'$ (according to the expression (18)). If the signature $\sigma'$ is an authorized signature, $d'=d$, so that $h'=h$, and $\Pi'=\Pi$. Therefore, $\beta'=\beta$, and therefore, $u'=u$.

Furthermore, the signature verifying apparatuses 20 and 120 calculates the exclusive-OR value $w'(+)u'$ of the M'-bit value $w' \in \{0,1\}^{M'}$ at the second bit position of the exclusive-OR value $d'$ and the hash value $u'$ and regards the calculation result as the recovery message $m_{rec}' \in \{0,1\}^{M'}$ (expression (19)). If the signature $\sigma'$ is an authorized signature, $u'=u$, $M'=M$, and $d'=d$. In this case, $w'=w$, and therefore, $m_{rec}'=w'(+)u'=w(+)u=m_{rec}(+)u(+)u=m_{rec}$.

Then, the signature verifying apparatuses 20 and 120 determine the hash value $H_1(\alpha') \in \{0,1\}^L$ by applying the hash function $H_1$ to the value $\alpha'$ that depends on the hash value $\Pi'$ and the recovery message $m_{rec}'$ (expression (20)). If the signature $\sigma'$ is an authorized signature, $\Pi'=\Pi$, $m_{rec}'=m_{rec}$, $\alpha'=\alpha$, and $h'=h$. In addition, $h'=H_1(\alpha')$, because $h=H_1(\alpha)$ in the signature generating apparatus. That is, if the signature $\sigma'$ is an authorized signature, $h'=H_1(\alpha')$.

On the other hand, if it is difficult to solve the discrete logarithm problem in the cyclic group G, a third party who does not know the secret key x cannot determine the secret key x from the public key $y=g^x \in G$ and, therefore, cannot generate the signature $\sigma'=(r', s')$ that passes the verification described above. Therefore, the signature $\sigma'=(r', s')$ can be identified as an authorized signature generated by a person who knows the secret key x.

Third and Fourth Embodiments

Using the signature $\sigma'=(r', s')$, the signature verifying apparatuses 220 and 320 calculate the hash value $t'=H_3(\gamma')$ from the value $\gamma'$ that depends on r', and calculate the value $R'=g^{s'} \cdot y^{t'} \in G$. If the signature $\sigma'$ is an authorized signature, r'=r, and s'=s (s=k−t·x∈Z), so that $\gamma'=\gamma$, $t'=H_3(\gamma')=H_3(\gamma)=t$, and $y=g^x \in G$, and therefore, $R'=g^{s'} \cdot y^{t'}=g^s \cdot y^t=g^{k-t \cdot x} \cdot g^{t \cdot x}=g^k=R$.

In addition, the signature verifying apparatuses 220 and 320 determine the hash value $u'=H_2(\beta')$ for the value $\beta'$ that depends on the calculation result R' and the L-bit value $h' \in \{0, 1\}^L$ at the first bit position of r' of the signature $\sigma'$. If the signature $\sigma'$ is an authorized signature, r'=r, so that h'=h, and R'=R. Therefore, $\beta'=\beta$, and therefore, u'=u.

Furthermore, the signature verifying apparatuses 220 and 320 calculates the exclusive-OR value w'(+)u' of the M'-bit value $w' \in \{0, 1\}^{M'}$ at the second bit position of r' of the signature $\sigma'$ and the hash value u', and regards the calculation result as the recovery message $m_{rec}' \in \{0, 1\}^{M'}$. If the signature $\sigma'$ is an authorized signature, u'=u, M'=M, and r'=r. In this case, w'=w, and therefore, $m_{rec}'=w'(+)u'=w(+)u=m_{rec}(+)u(+)u=m_{rec}$.

Then, the signature verifying apparatuses 220 and 320 determine the hash value $H_1(\alpha') \in \{0, 1\}^L$ by applying the hash function $H_1$ to the value $\alpha'$ that depends on the calculation result R' and the recovery message $m_{rec}'$. If the signature $\sigma'$ is an authorized signature, R'=R, $m_{rec}'=m_{rec}$, $\alpha'=\alpha$, and h'=h. In addition, $h'=H_1(\alpha')$, because $h=H_1(\alpha)$ in the signature generating apparatus. That is, if the signature $\sigma'$ is an authorized signature, $h'=H_1(\alpha')$.

On the other hand, if it is difficult to solve the discrete logarithm problem in the cyclic group G, a third party who does not know the secret key x cannot determine the secret key x from the public key $y=g^x \in G$ and, therefore, cannot generate the signature $\sigma'=(r', s')$ that passes the verification described above. Therefore, the signature $\sigma'=(r', s')$ can be identified as an authorized signature generated by a person who knows the secret key x.

[Modifications]

The present invention is not limited to the embodiments described above. For example, although $\alpha$ is a value that depends only on $\Pi$ and $m_{rec}$, and $\alpha'$ is a value that depends only on $\Pi'$ and $m_{rec}'$ in the first and second embodiments, $\alpha$ may be a value that depends on $\Pi$, $m_{rec}$ and some third information, and $\alpha'$ may be a value that depends on $\Pi'$, $m_{rec}'$ and the third information. For example, the third information may include a parameter that identifies the clear message $m_{clr}$, the public key y or the group G. The same holds true for $\beta$ and $\beta'$ and $\gamma$ and $\gamma'$. If the third information is used, the precision of the signature verification is improved. In particular, when the third information is a parameter that identifies the group G, an unauthorized signature generated by using an unauthorized group (a group for which the discrete logarithm problem can be easily solved and the result of calculation by the group calculator 20e is the same as the calculation result for the authorized cyclic group G, for example) can be prevented from passing the verification.

Similarly, although $\alpha$ is a value that depends only on R and $m_{rec}$, and $\alpha'$ is a value that depends only on R' and $m_{rec}'$ in the third and fourth embodiments, $\alpha$ may be a value that depends on R, $m_{rec}$ and some third information, and $\alpha'$ may be a value that depends on R', $m_{rec}'$ and the third information. The same holds true for $\beta$ and $\beta'$ and $\gamma$ and $\gamma'$.

Furthermore, although the signature generating apparatuses 10, 110, 210 and 310 perform key generation in the embodiments described above, another apparatus may perform key generation. Furthermore, although the public key server apparatus 30 presents the public key y in the embodiments described above, the signature generating apparatuses 10, 110, 210 and 310 may transmit the public key y to the signature verifying apparatuses 20, 120, 220 and 320. Furthermore, $Z_q$ (a complete residue system modulo q) in the processings may be replaced with Z (integer).

Furthermore, although the signature verifying apparatuses 20, 120, 220 and 320 calculate the bit length of the recovery message from the bit length of r' of the signature $\sigma'$ and the bit length parameter L in the embodiments described above, the signature generating apparatuses 10, 110, 210 and 310 may transmit the bit length of the recovery message to the signature verifying apparatuses 20, 120, 220 and 320.

Furthermore, at least the recovery message $m_{rec}$ is a signature target in the embodiments described above. That is, the bit lengths M and M' of the recovery messages $m_{rec}$ and $m_{rec}'$ are equal to or greater than 1. Alternatively, however, in the first and third embodiments, the recovery messages $m_{rec}$ and $m_{rec}'$ may be null, and only the clear messages $m_{clr}$ and $m_{clr}'$ may be signature targets. This means that the bit lengths M and M' of the recovery messages $m_{rec}$ and $m_{rec}'$ are 0. Alternatively, the bit lengths M and M' may be configurable within a range M≧0. In this case, it is possible to switch between the message recovery signature and the normal signature depending on the settings of the bit lengths M and M'. The processings that become unnecessary as a result of setting the recovery messages $m_{rec}$ and $m_{rec}'$ at null and setting the bit lengths M and M' at 0 can be omitted. The operation of the parts responsible for the unnecessary processings can be stopped.

The "hash function" in the present invention refers to a function that calculates a representative value for certain data. According to the present invention, the hash function is not limited to SHA-1, MD5 or the like but can be a common key cryptography function, such as DES and Camellia, into which a common key is substituted.

Furthermore, the processings described above may be performed in time series in the order described above or may be performed in parallel or separately as required or depending on the processing capability of the apparatuses that perform the processings. Furthermore, of course, various other modifications can be appropriately made without departing from the spirit of the present invention.

When the configurations described above are implemented on a computer, the specific capabilities of the apparatuses are described as programs. The specific capabilities are implemented on the computer by executing the programs on the computer.

The programs describing the specific capabilities can be recorded in a computer-readable recording medium. The computer-readable recording medium may be any type of medium, such as a magnetic recorder, an optical disk, a magneto-optical recording medium and a semiconductor memory. To be specific, the magnetic recorder may be a hard disk drive, a flexible disk or a magnetic tape, for example. The optical disk may be a digital versatile disc (DVD), a digital versatile disc random access memory (DVD-RAM), a compact disc read only memory (CD-ROM), a compact disc recordable (CD-R) or a compact disc rewritable (CD-RW), for example. The magneto-optical recording medium may be a magneto-optical disc (MO), for example. The semiconductor memory may be an electronically erasable and programmable read only memory (EEP-ROM), for example.

The programs are distributed by sale, transfer, rental or the like of a portable recording medium, such as a DVD and a CD-ROM, on which the programs are recorded. Alternatively, the programs may be stored in a storage device of a server computer and distributed by the server computer transferring the programs to other computers over a network.

For example, the computer that executes such a program first stores the program recorded on a portable recording medium or transferred from the server computer in a storage device thereof. When the computer performs the processing, the computer reads the program from the storage device thereof and performs the processing according to the read program. Alternatively, the computer may read the program directly from the portable recording medium and perform the processing according to the program. As a further alternative, the computer may perform the processing according to the program each time the computer receives a program transferred from the server computer. As a further alternative, the processing may be performed by on an application service provider (ASP) basis, in which the server computer does not transmit the program to the computer, and the specific capabilities are implemented only through execution instruction and result acquisition. The programs according to the embodiments of the present invention include a quasi-program, which is information processed by a computer (data or the like that is not a direct instruction to a computer but has a property that defines the processing performed by the computer).

In the above description, the apparatuses according to the embodiments of the present invention are implemented by executing a predetermined program on a computer. However, at least part of the processings may be implemented in the form of hardware.

INDUSTRIAL APPLICABILITY

The present invention can be applied to various applications using the electronic signature.

What is claimed is:

1. A signature generating apparatus, comprising:
   an arbitrary value generator that generates an arbitrary value k which is an integer;
   a group calculator configured to calculate $R=g^k \in G$, where G is a cyclic group of order q having a generator g, to generate a calculation result R;
   a first hash calculator configured to apply a hash function $H_1: \{0, 1\}^* \rightarrow \{0, 1\}^L$ to a value $\alpha$, to generate an L-bit hash value $h=H_1(\alpha) \in \{0, 1\}^L$, where the hash function $H_1$ outputs an L-bit value in response to an input value, L is a positive integer shared with a signature verifying apparatus, and the value $\alpha$ depends on the calculation result R and an M-bit recovery message $m_{rec} \in \{0,1\}^M$;
   a second hash calculator configured to apply a hash function $H_2: \{0, 1\}^* \rightarrow \{0, 1\}^M$ to a value $\beta$, to generate an M-bit hash value $u=H_2(\beta) \in \{0, 1\}^M$, where an output bit length M of the hash function $H_2$ is determined according to the bit length M of the recovery message $m_{rec}$, and the value $\beta$ depends on the calculation result R and the hash value h;
   an r value calculator configured to calculate a value r that depends on an L+M-bit bit connection value $h|w \in \{0, 1\}^{L+M}$ in which the hash value $h \in \{0, 1\}^L$ is placed at a first bit position and an exclusive-OR value $w \in \{0, 1\}^M$ is placed at a second bit position, and from which the hash value h and the exclusive-OR value w are capable of being recovered, wherein the exclusive OR value w is obtained by exclusive OR calculation of the recovery message $m_{rec}$ and the hash value u according to $w=m_{rec} (+)u \in \{0,1\}^M$, where (+) represents an exclusive-OR operator;
   a third hash calculator configured to apply a hash function $H_3: \{0, 1\}^* \rightarrow Z$ to a value $\gamma$ which depends on the value r, to generate a hash value $t=H_3(\gamma) \in Z$, where Z is an integer, and the hash function $H_3$ outputs an integer in response to an input value;
   an integer calculator that calculates $s=k-t \cdot x \in Z$ to generate a calculation result s, where x is a secret key which is an integer; and
   a signature output unit configured to output a signature $\sigma=(r, s)$.

2. A signature generating apparatus according to claim 1, further comprising:
   a fourth hash calculator configured to apply a hash function $H_0: \{0, 1\}^* \rightarrow \{0, 1\}^{L+M}$ to the calculation result R, to generate an L+M-bit hash value $\Pi=H_0(R) \in \{0, 1\}^{L+M}$, where an output bit length L+M of the hash function $H_0$ is determined according to the bit length M of the recovery message $M_{rec}$;
   wherein the value $\alpha$ is a value that depends on the hash value $\Pi$ and the recovery message $m_{rec}$,
   the value $\beta$ is a value that depends on the hash value $\Pi$ and the hash value h, and
   the r value calculator includes:
   a bit connecting unit configured to calculate an L+M-bit bit connection value $d=h|w \in \{0, 1\}^{L+M}$ in which the hash value $h \in \{0, 1\}^L$ is placed at the first bit position and the exclusive-OR value $w \in \{0, 1\}^M$ is placed at the second bit position; and
   a second exclusive-OR calculator configured to calculate an exclusive OR of the hash value $\Pi$ and the bit connection value d according to $r=\Pi(+)d \in \{0, 1\}^{L+M}$ to generate the value r.

3. A signature generating apparatus according to claim 1, wherein the r value calculator includes:
   a bit connecting unit configured to calculate an L+M-bit bit connection value according to $r=h|w \in \{0, 1\}^{L+M}$ in which the hash value $h \in \{0, 1\}^L$ is placed at the first bit position and the exclusive-OR value $w \in \{0, 1\}^M$ is placed at the second bit position, to generate value r.

4. A signature generating apparatus according to any one of claims 1 to 3, wherein $M \geq 1$.

5. A signature generating apparatus according to any one of claims 1 to 3,
   wherein the third hash calculator is configured to apply the hash function $H_3: \{0, 1\}^* \rightarrow Z$ to a value $\gamma$ which depends on the value r and an N-bit clear message $m_{clr} \in \{0,1\}^N$, to generate a hash value $t=H_3(\gamma) \in Z$, and
   the signature output unit is configured to output the signature $\sigma=(r, s)$ and the clear message $m_{clr}$.

6. A signature generating apparatus according to claim 5, wherein $M \geq 0$,
   the recovery message $m_{rec}$ and the exclusive-OR value w are null when $M=0$, and
   the processing of storing the recovery message $m_{rec}$ in the second storage, the processing of the second hash calculator and the processing of the first exclusive-OR calculator are stopped when $M=0$.

7. A signature generating apparatus according to claim 1, wherein the generator g is a point $(g_1, g_2)$ on an elliptic curve E, and the $R=g^k \in G$ is a point $k \cdot g \in E$ on the elliptic curve E.

8. A signature generating apparatus according to claim 2, wherein the generator g is a point $(g_1, g_2)$ on an elliptic curve E, and the $R=g^k \in G$ is point $k \cdot g \in E$ on the elliptic curve E, and the calculation that applies the hash function $H_0:\{0, 1\}^* \rightarrow \{0, 1\}^{L+M}$ to the calculation result R is a calculation that applies the hash function $H_0$ to a value that uniquely or restrictively determine the calculation result R which is a point on the elliptic curve E.

9. A signature generating apparatus according to claim 1, wherein the $R=g^k \in G$ is a calculation $g^x$ mod p, where the generator g is an integer equal to or greater than 2, and $p=2q+1$.

10. A signature verifying apparatus, comprising:
a signature input unit configured to accept input of a signature $\sigma'=(r', s')$;
a first hash calculator configured to apply a hash function $H_3:\{0, 1\}^* \rightarrow Z$ to a value $\gamma'$, to generate a hash value $t'=H_3(\gamma') \in Z$, where Z is an integer, the hash function $H_3$ outputs an integer in response to an input value, and the value $\gamma'$ depends on r' of the signature $\sigma'$;
a group calculator configured to calculate $R'=g^{s'} \cdot y^{t'} \in G$ to generate the calculation result R', wherein y is a public key $y=g^x \in G$ that is associated with a secret key $x \in Z$ of a signature generating apparatus, where G is a cyclic group of order q having a generator g;
a second hash calculator configured to apply a hash function $H_2:\{0, 1\}^* \rightarrow \{0, 1\}^{M'}$ to a value $\beta'$, to generate an M'-bit hash value $u'=H_2(\beta') \in \{0, 1\}^{M'}$, where an output bit length M' of the hash function $H_2$ is determined according to the bit length M' of a recovery message $m_{rec}'$ associated with the signature $\sigma'$, the value $\beta'$ depends on the calculation result R' and an L-bit value $h' \in \{0, 1\}^L$ at a first bit position of r', and L is a positive integer shared with the signature generating apparatus;
a first exclusive-OR calculator configured to calculate an exclusive OR $w'(+)u'$ of a value $w' \in \{0, 1\}^{M'}$ and the hash value u', to generate a calculation result of the exclusive OR $w'(+)u'$ as the recovery message $m_{rec}' \in \{0, 1\}^{M'}$, where the value w' depends on an M'-bit value at a second bit position of the value r';
a third hash calculator configured to apply a hash function $H_1:\{0, 1\}^* \rightarrow \{0, 1\}^L$ to a value $\alpha'$, to generate an L-bit hash value $H_1:(\alpha') \in \{0, 1\}^L$, where the hash function $H_1$ outputs an L-bit value in response to an input value, and the value $\alpha'$ depends on the calculation result R' and the recovery message $m_{rec}'$ calculated by the first exclusive-OR calculator; and
a comparator configured to compare the L-bit value h' and the hash value $H_1(\alpha')$, and output information on the condition that $h'=H_1(\alpha')$ as verification has succeeded.

11. A signature verifying apparatus according to claim 10, further comprising:
a fourth hash calculator configured to apply a hash function $H_0:\{0, 1\}^* \rightarrow \{0, 1\}^{L+M'}$ to the calculation result R', to generate an L+M'-bit hash value $\Pi'=H_0(R') \in \{0, 1\}^{L+M'}$, where an output bit length L+M' of the hash function $H_0$ is determined according to the bit length M' of the recovery message $m_{rec}'$; and
a second exclusive-OR calculator configured to calculate an exclusive OR $d'=\Pi'(+)r' \in \{0, 1\}^{L+M'}$ of the hash value $\Pi'$ and r' of the signature $\sigma'$, to generate an exclusive-OR value d',
wherein the value $\beta'$ is a value that depends on the hash value $\Pi$ and the L-bit value $h' \in \{0, 1\}^L$ at the first bit position of the exclusive-OR value d',
the value w' is an M'-bit value at the second bit position of the exclusive-OR value d', and the value $\alpha'$ is a value that depends on the hash value $\Pi'$ and the recovery message $m_{rec}'$ calculated by the first exclusive-OR calculator.

12. A signature verifying apparatus according to claim 10, wherein the value w' is an M'-bit value at the second bit position of the value r'.

13. A signature verifying apparatus according to any one of claims 10 to 12, wherein $M' \geq 1$.

14. A signature verifying apparatus according to any one of claims 10 to 12, wherein the signature input unit is configured to accept input of the signature $\sigma'$ and a clear message m associated with the signature $\sigma'$,
the signature verifying apparatus further comprises a fourth storage that stores the clear message $m_{clr}'$, and
the first hash calculator is configured to apply the hash function $H_3:\{0, 1\}^* \rightarrow Z$ to a value $\gamma'$ which depends on r' of the signature $\sigma'$ and the clear message $m_{clr}'$ to generate a hash value $t'=H_3(\gamma') \in Z$.

15. A signature verifying apparatus according to claim 10, wherein the signature input unit is configured to accept input of the signature $\sigma'$ and a clear message $m_{clr}'$ associated with the signature $\sigma'$,
the first hash calculator is configured to apply the hash function $H_3:\{0, 1\}^* \rightarrow Z$ to a value $\gamma'$ which depends on r' of the signature $\sigma'$ and the clear message $m_{clr}'$, to t generate a hash value $t'=H_3(\gamma') \in Z$,
$M' \geq 0$,
the recovery message $m_{rec}'$ is null when $M'=0$, and
when $M'=0$, the processing of the second hash calculator and the processing of the first exclusive-OR calculator are stopped, and the third hash calculator applies the hash function $H_1$ to the value $\alpha'$ that depends on the calculation result R', to generate a hash value $H_1(\alpha')$.

16. A signature verifying apparatus according to claim 10, wherein the generator g is a point $(g_1, g_2)$ on an elliptic curve E, the public key $y=g^x \in G$ is a point x g∈E on the elliptic curve E, and the $R=g^{s'} \cdot y^{t'} \in G$ is a point $s' \cdot g + t' \cdot y \in E$ on the elliptic curve E.

17. A signature verifying apparatus according to claim 11, wherein the generator g is a point $(g_1, g_2)$ on an elliptic curve E, public key $y=g^x \in G$ is a point x g∈E on the elliptic curve E,
the $R=g^{s'} \cdot y^{t'} \in G$ is a point $s' \cdot g + t' \cdot y \in E$ on the elliptic curve E, and
the calculation that applies the hash function $H_0:\{0, 1\}^* \rightarrow \{0, 1\}^{L+M'}$ to the calculation result R' is a calculation that applies the hash function $H_0$ to a value that uniquely or restrictively determine the calculation result R' which is a point on the elliptic curve E.

18. A signature verifying apparatus according to claim 10, wherein the public key $y=g^x \in G$ is $g^x$ mod p, where the generator g is an integer equal to or greater than 2, and $p=2q+1$, and
the $R'=g^{s'} \cdot y^{t'} \in G$ is $g^{s'} \cdot y^{t'}$ mod p.

19. A signature generating method conducted by a signature generating apparatus,
the method comprising:
(a) generating an arbitrary value k which is an integer;
(b) calculating $R=g^k \in G$, where G is a cyclic group of order q having a generator g, to generate a calculation result R;
(c) applying a hash function $H_1:\{0, 1\}^* \rightarrow \{0, 1\}^L$ to a value $\alpha$, to generate an L-bit hash value $h=H_1(\alpha) \in \{0, 1\}^L$, where the hash function $H_1$ outputs an L-bit value in response to an input value, L is a positive integer shared with a signature verifying apparatus, and the value a depends on the calculation result R and an M-bit recovery message $m_{rec} \in \{0,1\}^M$;

(d) applying a hash function $H_2$: $\{0, 1\}^* \rightarrow \{0, 1\}^M$ to a value $\beta$, to generate an M-bit hash value $u=H_2(\beta) \in \{0, 1\}^M$, where an output bit length M of the hash function $H_2$ is determined according to the bit length M of the recovery message $m_{rec}$, and the value $\beta$ depends on the calculation result R and the hash value h;

(e) calculating a value r that depends on an L+M-bit bit connection value $h|w \in \{0, 1\}^{L+M}$ in which the hash value h E $\{0, 1\}^L$ is placed at a first bit position and the exclusive-OR value $w \in \{0, 1\}^M$ is placed at a second bit position, and from which the hash value h and the exclusive-OR value w are capable of being recovered, wherein the exclusive OR value w is obtained by exclusive OR calculation of the recovery message $m_{rec}$ and the hash value u according to $w=m_{rec}(+)u \in \{0,1\}^M$, where (+) represents an exclusive-OR operator;

(f) applying a hash function $H_3$: $\{0, 1\}^* \rightarrow Z$ to a value $\gamma$, which depends on the value r, to generate a hash value $t=H_3(\gamma) \in Z$, where Z is an integer, and the hash function $H_3$ outputs an integer in response to an input value;

(g) calculating $s=k-t \cdot x \in Z$ to generate a calculation result s, where x is a secret key which is an integer; and (h) outputting a signature $\sigma=(r, s)$.

20. A signature generating method according to claim 19, further comprising applying a hash function $H_0$: $\{0, 1\}^* \rightarrow \{0, 1\}^{L+M}$ to the calculation result R, to generate an L+M-bit hash value $\Pi=H_0(R) \in \{0, 1\}^{L+M}$, where an output bit length L+M of the hash function $H_0$ is determined according to the bit length M of the recovery message $m_{rec}$, wherein the value $\alpha$ is a value that depends on the hash value $\Pi$ and the recovery message $m_{rec}$, the value $\beta$ is a value that depends on the hash value $\Pi$ and the hash value h, and the calculating (e) includes of:

(e-1) calculating an L+M-bit bit connection value $d=h|w \in \{0, 1\}^{L+M}$ in which the hash value $h \in \{0, 1\}^L$ is placed at the first bit position and the exclusive-OR value $w \in \{0, 1\}^M$ is placed at the second bit position; and (e-2) calculating an exclusive OR of the hash value $\Pi$ and the bit connection value d according to $r=\Pi(+)d \in \{0, 1\}^{L+M}$ to generate the value r.

21. A signature generating method according to claim 19, wherein the calculating (e) includes:

calculating an L+M-bit bit connection according to $r=h|w \in \{0, 1\}^{L+M}$ in which the hash value $h \in \{0, 1\}^L$ is placed at the first bit position and the exclusive-OR value $w \in \{0, 1\}^M$ is placed at the second bit position, to generate the value r.

22. A signature verifying method conducted by a signature verifying apparatus, the method comprising:

(a) accepting input of a signature $\sigma'=(r', s')$;

(b) applying a hash function $H_3$: $\{0, 1\}^* \rightarrow Z$ to a value $\gamma'$ which depends on r' of the signature $\sigma'$, to generate a hash value $t'=H_3(\gamma') \in Z$, where Z is an integer, and the hash function $H_3$ outputs an integer in response to an input value;

(c) calculating $R'=g^{s'} y^{t'} \in G$ to generate the calculation result R', wherein y is a ublic key $y=g^x \in G$ that is associated with a secret key $x \in Z$ of a signature generating apparatus, where G is a cyclic group of order q having a generator g;

(d) applying a hash function $H_2$: $\{0, 1\}^* \rightarrow \{0, 1\}^{M'}$ to a value $\beta'$, to generate an M'-bit hash value $u'=H_2(\beta') \in \{0, 1\}^{M'}$ where the output bit length M' of the hash function $H_2$ is determined according to a bit length M' of a recovery message $m_{rec}'$ associated with the signature $\sigma'$, the value $\beta'$ depends on the calculation result R' and an L-bit value $h' \in \{0, 1\}^L$ at a first bit position of r', and L is a positive integer shared with the signature generating apparatus;

(e) calculating an exclusive OR $w'(+)u'$ of a value $w' \in \{0, 1\}^{M'}$ and the hash value u', to generate a calculation result of the exclusive OR $w'(+)u'$ as the recovery message $m_{rec}' \in \{0, 1\}^{M'}$, where the value w' depends on an M'-bit value at a second bit position of the value r';

(f) applying a hash function $H_1$: $\{0, 1\}^* \rightarrow \{0, 1\}^L$ to a value $\alpha'$, to generate an L-bit hash value $H_1(\alpha') \in \{0, 1\}^L$, where the hash function $H_1$ outputs an L-bit value in response to an input value, and the value $\alpha'$ depends on the calculation result R' and the recovery message $m_{rec}'$ calculated in the calculating (e); and (g) comparing the L-bit value h' and the hash value $H_1(\alpha')$, and outputting information on the condition that $h'=H_1(\alpha')$ as verification has succeeded.

23. A signature verifying method according to claim 22, further comprising:

applying a hash function $H_0$: $\{0, 1\}^* \rightarrow \{0, 1\}^{L+M'}$ to the calculation result R', to generate an L+M'-bit hash value $\Pi'=H_0(R') \in \{0, 1\}^{L+M'}$, where an output bit length L+M' of the hash function $H_0$ is determined according to the bit length M' of the recovery message $m_{rec}'$ and L is a positive integer shared with the signature generating apparatus; and calculating an exclusive OR $d'=\Pi'(+)r' \in \{0, 1\}^{L+M'}$ of the hash value $\Pi'$ and r' of the signature $\sigma'$, to generate an exclusive-OR value d', wherein the value $\beta$ is a value that depends on the hash value $\Pi'$ and the L-bit value $h' \in \{0, 1\}^L$ at the first bit position of the exclusive-OR value d', the value w' is an M'-bit value at the second bit position of the exclusive-OR value d', and the value $\alpha'$ is a value that depends on the hash value $\Pi'$ and the recovery message $m_{rec}'$ calculated in the calculating (e).

24. A signature verifying method according to claim 22, wherein the value w' is an M'-bit value at the second bit position of the value r'.

25. A non-transitory computer-readable recording medium having stored thereon a program that makes a computer function as the signature generating apparatus according to claim 1.

26. A non-transitory computer-readable recording medium having stored thereon a program that makes a computer function as the signature verifying apparatus according to claim 10.

27. A signature verifying apparatus according to claim 10, wherein the comparator is configured to output the information including the recovery message $m_{rec}'$ on the condition that $h'=H_1(\alpha')$ as verification has succeeded.

28. A signature verifying method according to claim 22, wherein the comparing (g) includes outputting the information including the recovery message $m_{rec}'$ on the condition that $h'=H_1(\alpha')$ as verification has succeeded.

* * * * *